US012781364B2

(12) United States Patent
Kajimoto et al.

(10) Patent No.: US 12,781,364 B2
(45) Date of Patent: Nov. 3, 2026

(54) ION EXCHANGE MEMBRANE AND ELECTROLYZER

(71) Applicant: ASAHI KASEI KABUSHIKI KAISHA, Tokyo (JP)

(72) Inventors: Nao Kajimoto, Tokyo (JP); Koji Okamoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 861 days.

(21) Appl. No.: 18/139,518

(22) Filed: Apr. 26, 2023

(65) Prior Publication Data

US 2023/0349058 A1 Nov. 2, 2023

(30) Foreign Application Priority Data

Apr. 28, 2022 (JP) ................................ 2022-074574
Apr. 19, 2023 (JP) ................................ 2023-068410

(51) Int. Cl.

| | |
|---|---|
| ***C25B 13/08*** | (2006.01) |
| ***B01J 39/05*** | (2017.01) |
| ***B01J 39/20*** | (2006.01) |
| ***B01J 47/127*** | (2017.01) |
| ***C25B 1/46*** | (2006.01) |
| ***C25B 13/02*** | (2006.01) |

(52) U.S. Cl.

CPC ............... *C25B 13/08* (2013.01); *B01J 39/05* (2017.01); *B01J 39/20* (2013.01); *B01J 47/127* (2017.01); *C25B 13/02* (2013.01); *C25B 1/46* (2013.01)

(58) Field of Classification Search

CPC ................................ C25B 1/46; C25B 13/08
See application file for complete search history.

(56) References Cited

U.S. PATENT DOCUMENTS

| | | | | |
|---|---|---|---|---|
| 11,047,056 | B2 | 6/2021 | Ohashi et al. | |
| 2018/0126370 | A1 | 5/2018 | Nakajima et al. | |
| 2019/0100845 | A1 * | 4/2019 | Ohashi | C25B 11/095 |
| 2019/0218675 | A1 | 7/2019 | Yamaki et al. | |

FOREIGN PATENT DOCUMENTS

| | | | |
|---|---|---|---|
| CN | 107532315 | A | 1/2018 |
| CN | 111304691 | A | 6/2020 |
| JP | 6369844 | B1 | 7/2018 |
| JP | 2019-108607 | A | 7/2019 |

* cited by examiner

*Primary Examiner* — Hosung Chung
(74) *Attorney, Agent, or Firm* — Greenblum & Bernstein, P.L.C.

(57) ABSTRACT

An ion exchange membrane containing: a layer S containing a fluorine-containing polymer having a sulfonic acid group; a layer C containing a fluorine-containing polymer having a carboxylic acid group; and—a plurality of reinforcing materials functioning as at least one of reinforcement yarn and sacrifice yarn; wherein, when the ion exchange membrane is viewed from a top surface, an average cross-sectional thickness A of the ion exchange membrane measured in pure water for a region, is 20 μm or more and 75 μm or less, and wherein a strength change ratio calculated from strength S2 of the ion exchange membrane measured after the ion exchange membrane is subjected to a predetermined electrolysis test and strength S1 of the ion exchange membrane measured before the ion exchange membrane is subjected to the electrolysis test, in terms of 100×S2/S1, is 85% or more and 120% or less.

5 Claims, 13 Drawing Sheets

[Figure 1]
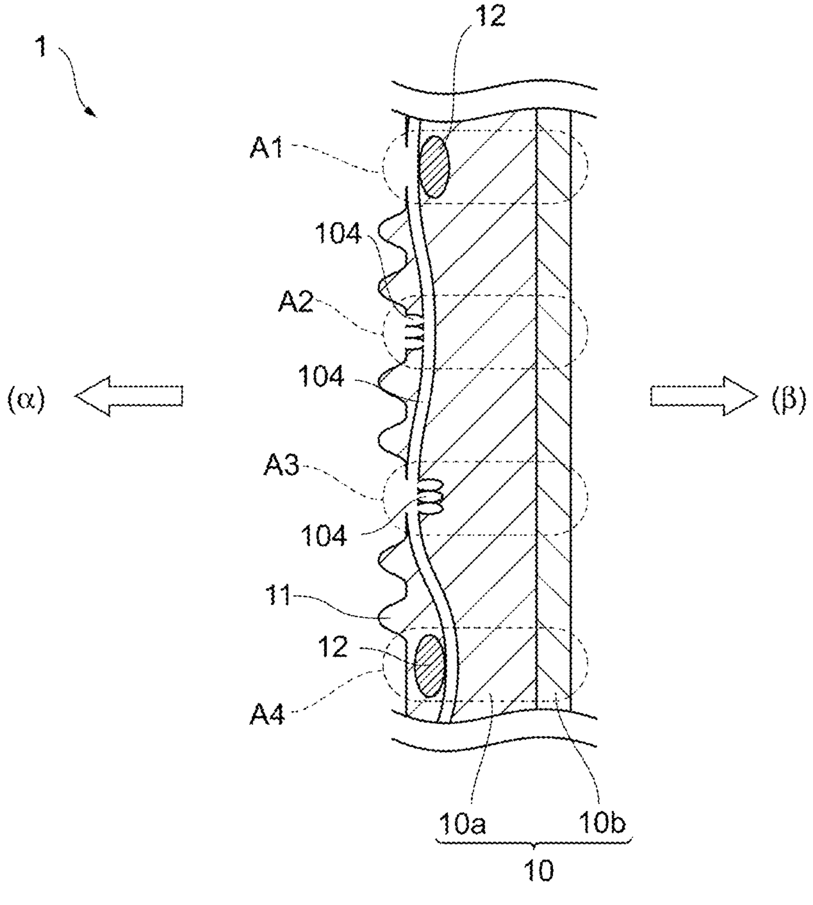

[Figure 2]
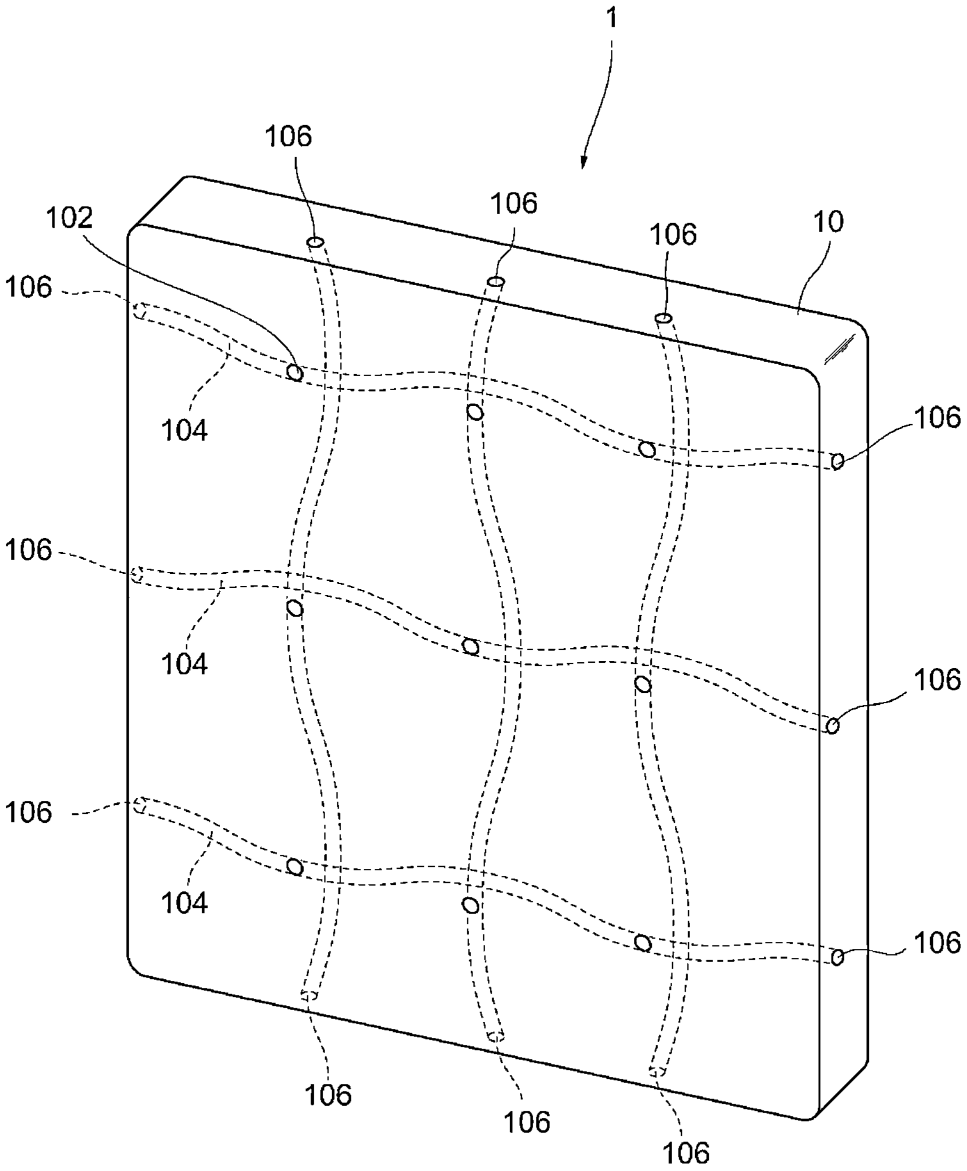

[Figure 3]
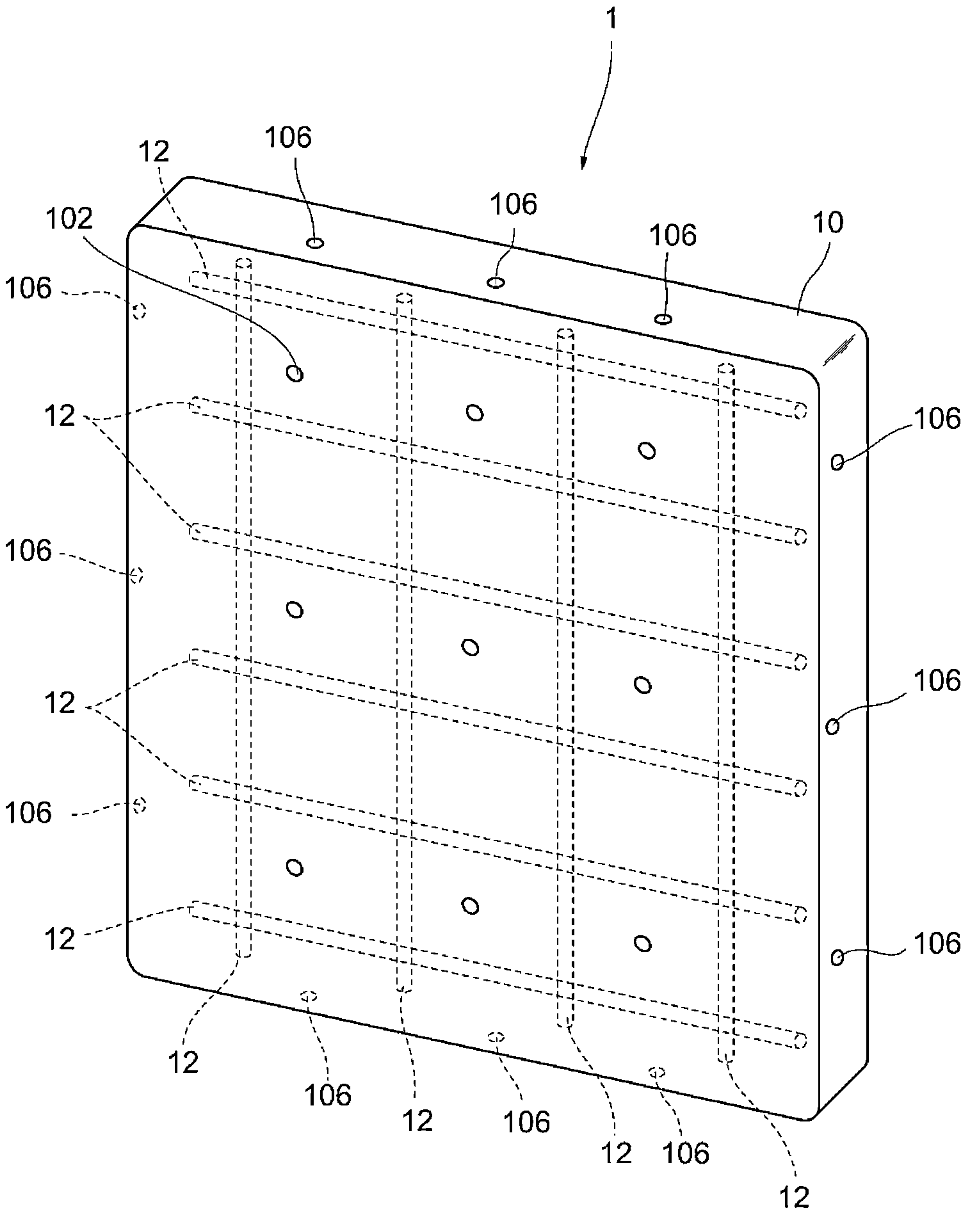

[Figure 4]
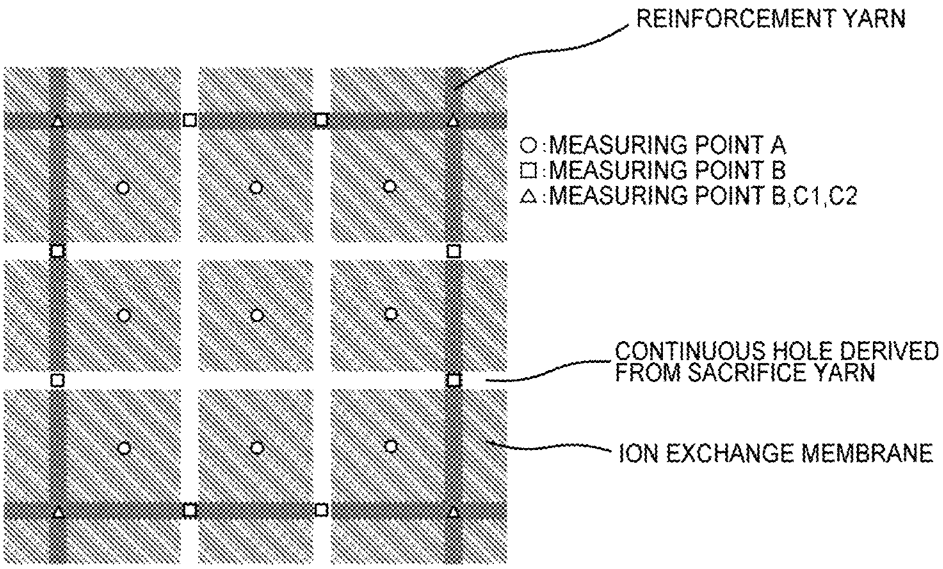
[Figure 5]
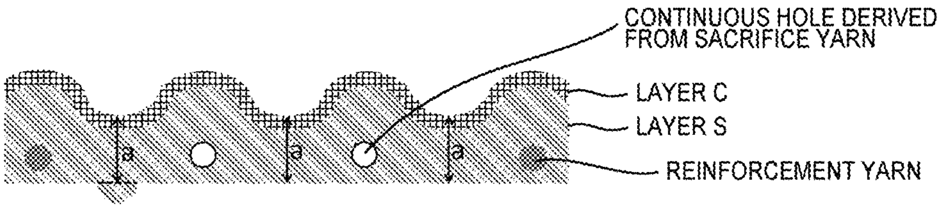
[Figure 6]
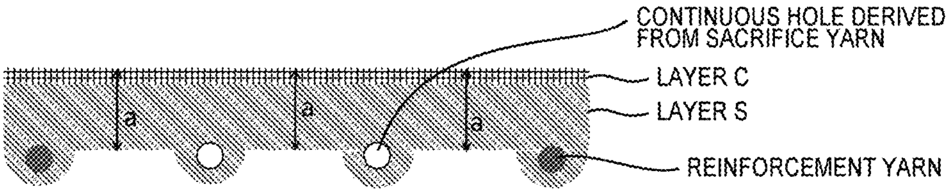
[Figure 7]
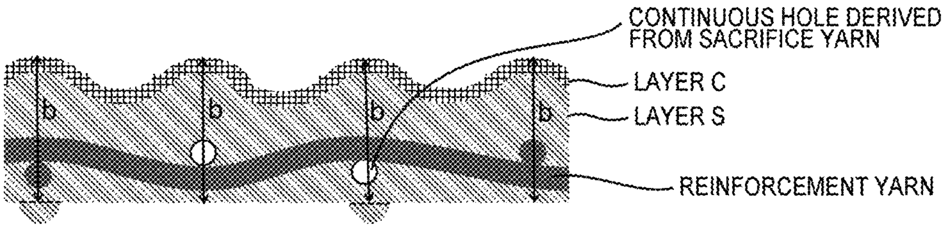

[Figure 8]
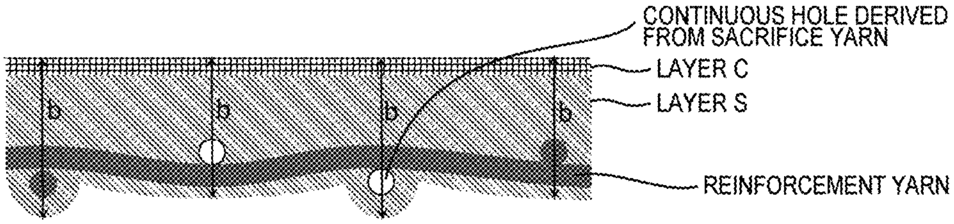
[Figure 9]
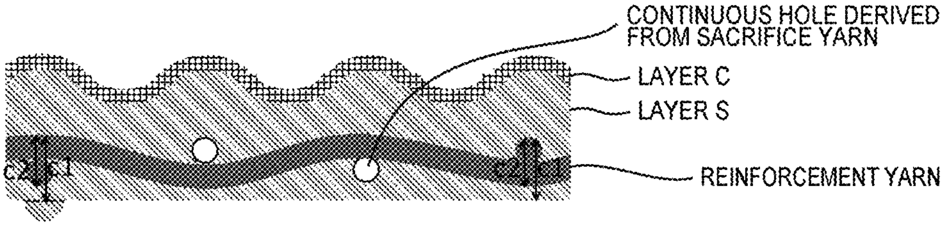
[Figure 10]
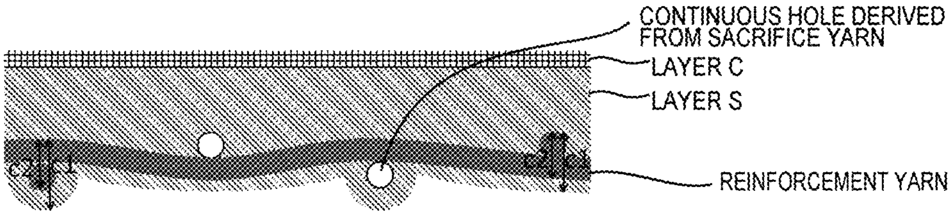
[Figure 11]
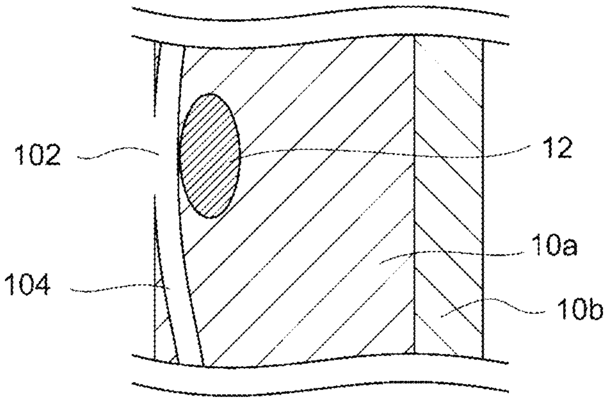

[Figure 12]
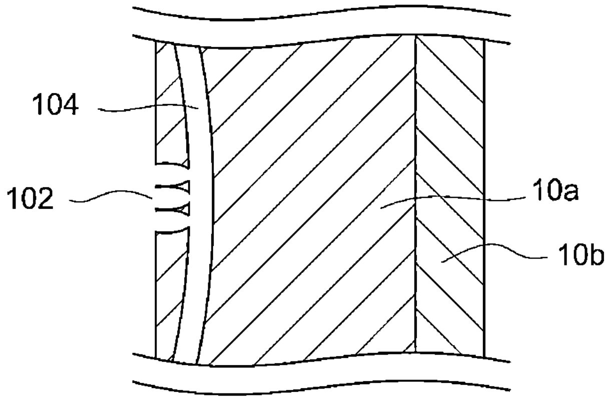
[Figure 13]
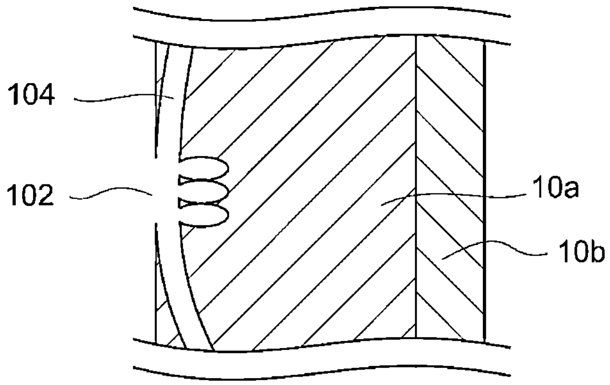

[Figure 14]
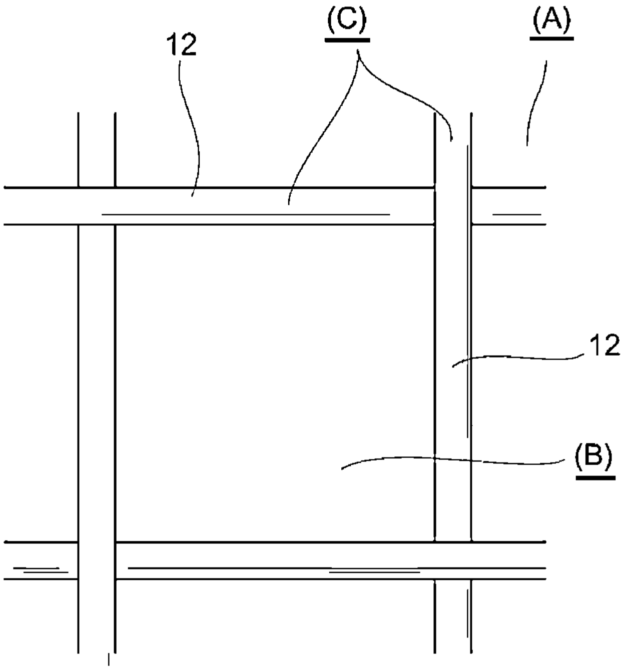
(B)=(A)-(C)
(B)/(A)=((A)-(C))/(A)

[Figure 15]
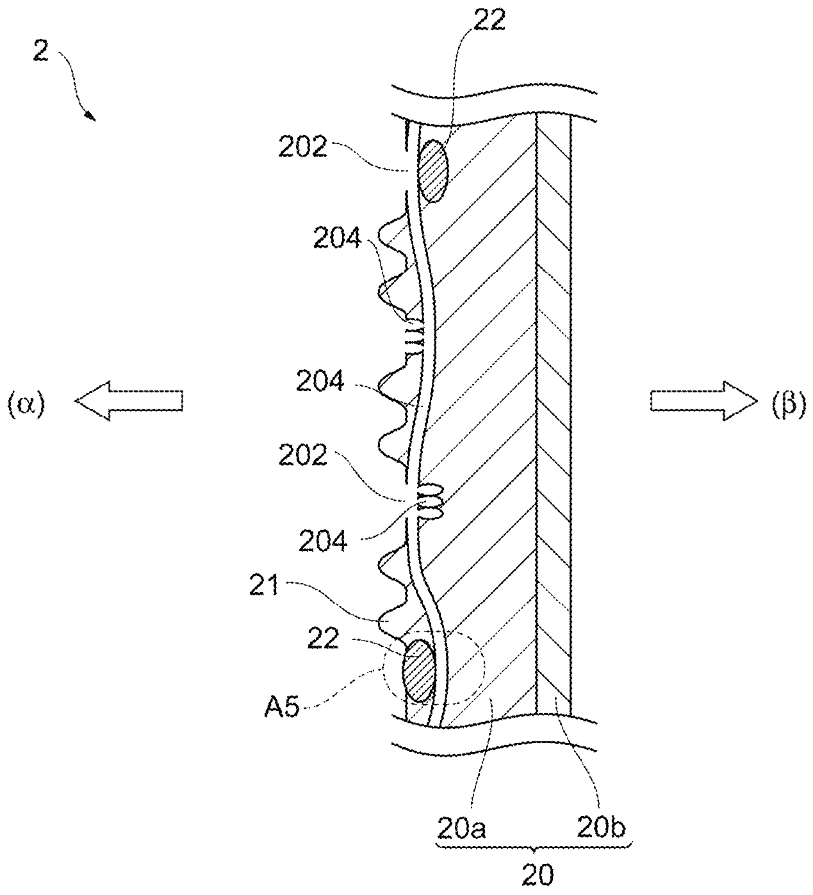

[Figure 16]
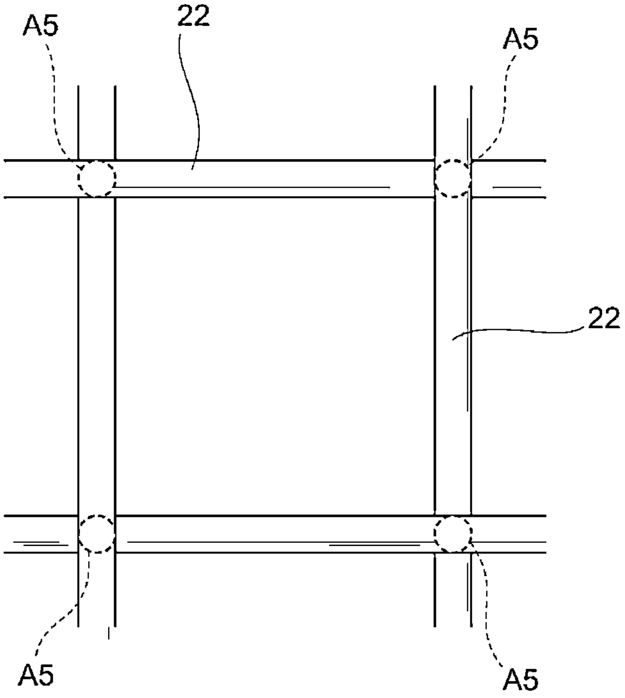

[Figure 17]
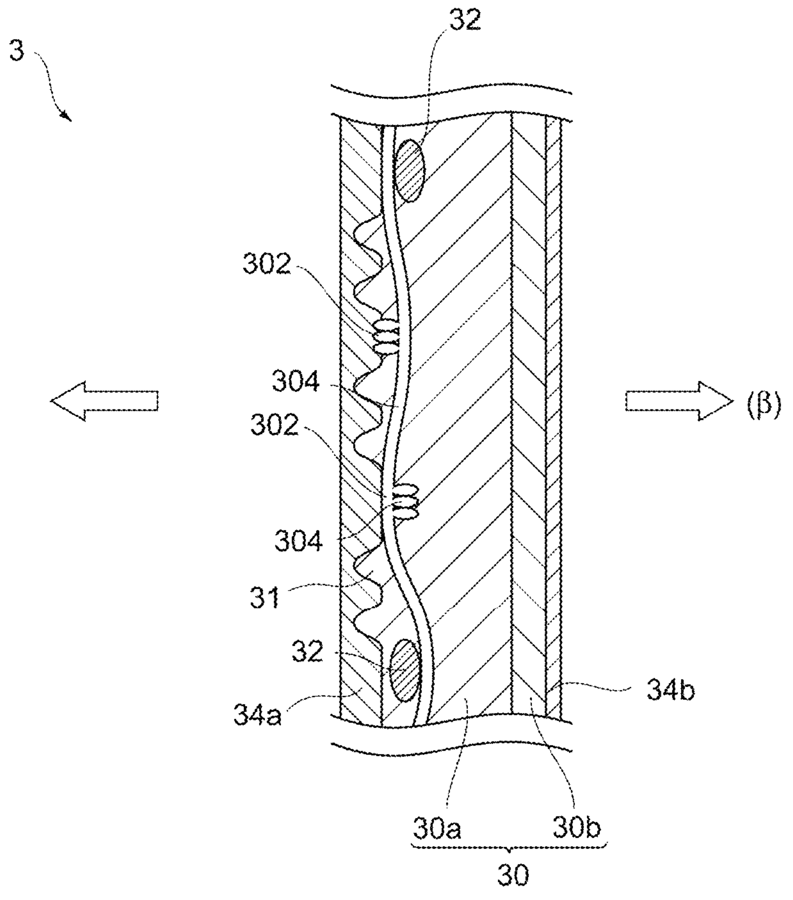

[Figure 18]
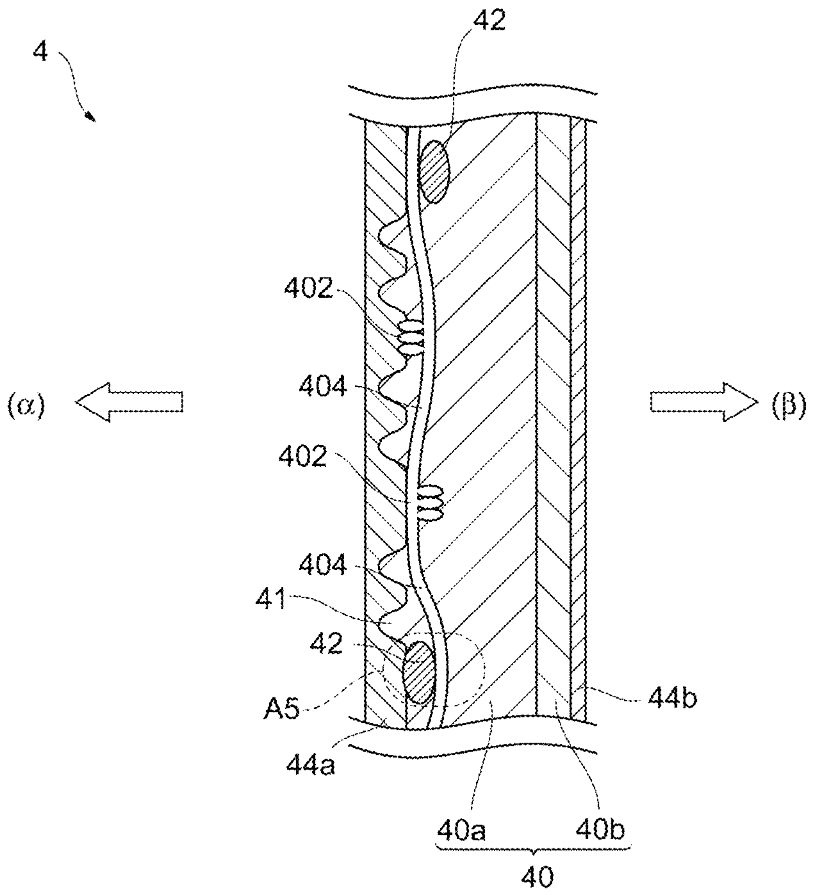

[Figure 19]
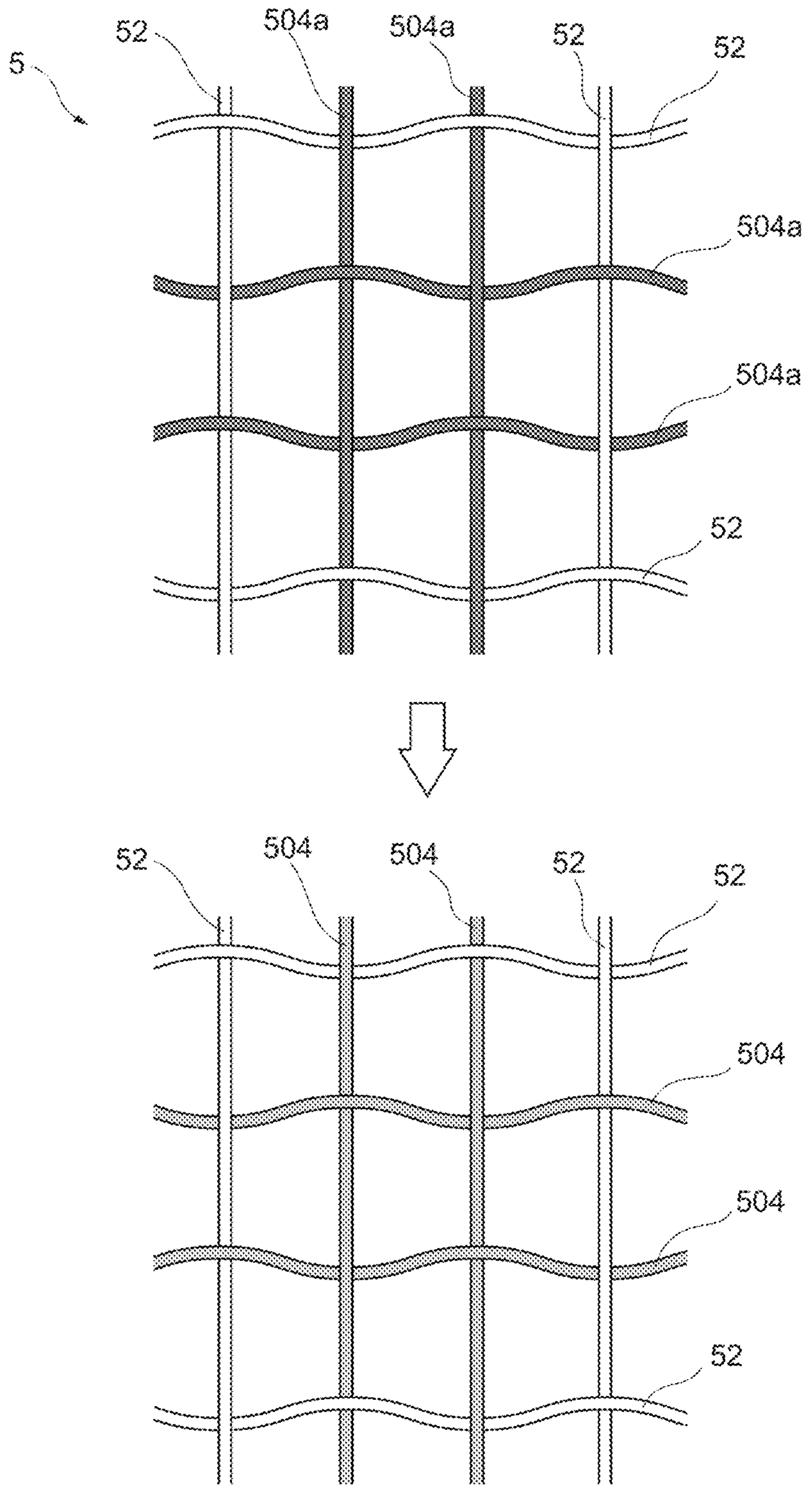

[Figure 20]
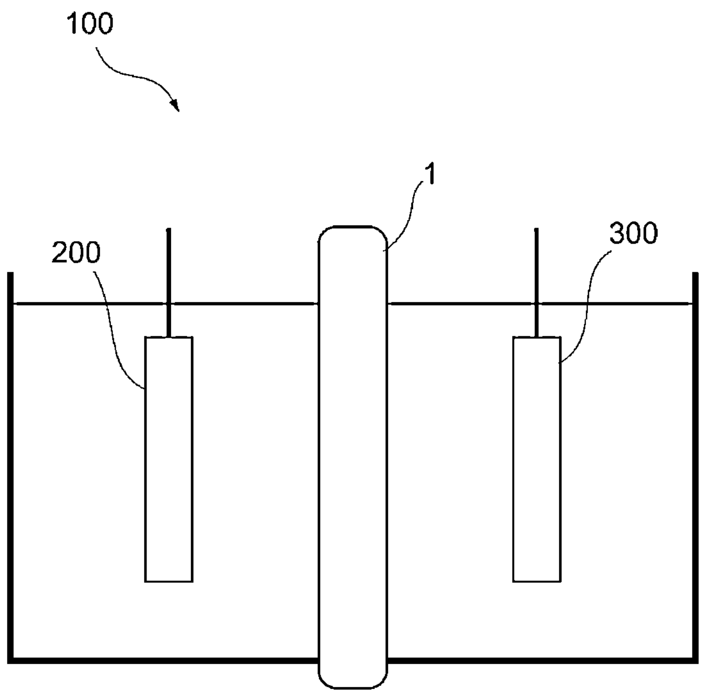

ION EXCHANGE MEMBRANE AND ELECTROLYZER

TECHNICAL FIELD

The present invention relates to an ion exchange membrane and an electrolyzer.

BACKGROUND ART

Fluorine-containing ion exchange membranes, which have excellent heat resistance, chemical resistance, and the like, are widely used as electrolytic membranes for, for example, alkali chloride electrolysis, ozone generation electrolysis, fuel cells, water electrolysis, and hydrochloric acid electrolysis in various applications, further extending to new applications.

Of these, in alkali chloride electrolysis for producing chlorine and alkali hydroxide, ion exchange membrane methods have been predominant recently. Additionally, in order to reduce the electric power consumption rate, natural-circulation zero-gap base electrolyzers including an ion exchange membrane, an anode, and a cathode in close contact one another have become predominant for alkali chloride electrolysis by ion exchange membrane methods. For ion exchange membranes used in alkali chloride electrolysis, required are various capabilities. For example, capabilities such as high mechanical strength of membranes are required. As an example to be contemplated from the viewpoint of strength, for example, Patent Literature 1 suggests an ion exchange membrane comprising a layer S comprising a fluorine-containing polymer having a sulfonic acid group, a layer C comprising a fluorine-containing polymer having a carboxylic acid group, and a plurality of reinforcing materials arranged inside the layer S and functioning as at least one of reinforcement yarn and sacrifice yarn, wherein A and B, both of which are defined below, satisfy formulas (1) and (2):

$$B \leq 240\ \mu m \quad (1)$$

$$2.0 \leq B/A \leq 5.0 \quad (2)$$

wherein, when the ion exchange membrane is viewed from the top surface, A represents an average cross-sectional thickness of the membrane measured in pure water for a region, in which the reinforcing materials do not exist, and B represents an average cross-sectional thickness of the membrane measured in pure water for a region, in which strands of the reinforcement yarn cross each other, and for a region, in which the reinforcement yarn crosses the sacrifice yarn.

CITATION LIST

Patent Literature

Patent Literature 1 Japanese Patent No. 6369844

SUMMARY OF INVENTION

Technical Problem

The ion exchange membrane described in Patent Literature 1 can reduce the electrolytic voltage in alkali chloride electrolysis using a natural-circulation zero-gap base electrolyzer while the high mechanical strength is retained. In contrast, studies conducted by the present inventors have revealed that, when the ion exchange membrane described in Patent Literature 1 is operated for electrolysis, its strength tends to significantly decrease before and after the operation. That is, the technique according to Patent Literature 1 still leaves room for further improvement, from the viewpoint of retention of the strength for a long period.

The present invention has been made in view of the above problem possessed by the conventional art, and it is an object thereof to provide an ion exchange membrane and the like that can retain the strength for a long period.

Solution to Problem

As a result of intensive studies to solve the problem, the present inventors have found that the problem described above can be solved by the strength change ratios before and after a predetermined electrolysis test of an ion exchange membrane having a predetermined structure being in a predetermined range, having completed the present invention.

That is, the present invention encompasses aspects as follows.

[1]

An ion exchange membrane comprising:

a layer S comprising a fluorine-containing polymer having a sulfonic acid group;

a layer C comprising a fluorine-containing polymer having a carboxylic acid group; and a plurality of reinforcing materials functioning as at least one of reinforcement yarn and sacrifice yarn;

wherein, when the ion exchange membrane is viewed from a top surface, an average cross-sectional thickness A of the ion exchange membrane measured in pure water for a region, in which the reinforcing materials do not exist, is 20 μm or more and 75 μm or less, and wherein a strength change ratio calculated from a strength S2 of the ion exchange membrane measured after the ion exchange membrane is subjected to an electrolysis test described below and a strength S1 of the ion exchange membrane measured before the ion exchange membrane is subjected to the electrolysis test, in terms of $100 \times S2/S1$, is 85% or more and 120% or less:

(Electrolysis Test)

A woven mesh formed by knitting a nickel fine wire having a diameter of 0.15 mm and coated with a cerium oxide and a ruthenium oxide as cathode catalysts in a sieve mesh size of 50 is used as a cathode, and a titanium expanded metal coated with a ruthenium oxide, an iridium oxide, and a titanium oxide as anode catalysts is used as an anode; the ion exchange membrane is arranged between the anode and the cathode, and further, in order to bring the cathode into close contact with the ion exchange membrane, a collector made of a nickel expanded metal is arranged on the cathode, and a mat formed by knitting a nickel fine wire is arranged between the collector and the cathode to provide a natural-circulation zero-gap electrolytic cell; four such zero-gap electrolytic cells are arranged in series for use as an electrolyzer; brine is supplied to an anode side of the electrolyzer while a concentration of the brine is adjusted to be 205 g/L, and water is supplied to a cathode side of the electrolyzer while the sodium hydroxide concentration is maintained at 32% by mass; and electrolysis is carried out for 7 days with a temperature of the electrolyzer set to 85° C., at a current density of 6 $kA/m^2$ under a condition in which a liquid pressure of the cathode side of the electrolyzer is higher than the liquid pressure of the anode side by 5.3 kPa.

[2]

The ion exchange membrane according to [1], wherein, when the ion exchange membrane is viewed from the top surface, a value of A/B is 0.15 or more and 0.30 or less, wherein B represents an average cross-sectional thickness of the ion exchange membrane measured in pure water for a region, in which strands of the reinforcement yarn cross each other, and for a region, in which the reinforcement yarn crosses the sacrifice yarn.

[3]

The ion exchange membrane according to [1] or [2], wherein the strength S1 is 1.10 kgf/cm or more and 1.55 kgf/cm or less.

[4]

The ion exchange membrane according to any of [1] to [3], wherein a ratio of the thickness Tc of the layer C to the A, in terms of Tc/A, is 0.165 or more and 0.508 or less.

[5]

An electrolyzer comprising the ion exchange membrane according to any of [1] to [4].

Advantageous Effect of Invention

According to the present invention, it is possible to provide an ion exchange membrane and the like that can retain the strength for a long period.

BRIEF DESCRIPTION OF DRAWINGS

FIG. 1 illustrates a schematic cross-sectional view showing one exemplary ion exchange membrane of the present embodiment.

FIG. 2 illustrates a simplified perspective view showing one exemplary ion exchange membrane of the present embodiment, partially cut out, to be used for illustrating an arrangement of opening portions and continuous holes.

FIG. 3 illustrates a simplified perspective view showing one exemplary ion exchange membrane of the present embodiment, partially cut out, to be used for illustrating an arrangement of reinforcement yarn.

FIG. 4 illustrates a schematic top view showing one exemplary measurement position of the thickness of the membrane according to the present embodiment.

FIG. 5 illustrates a schematic cross-sectional view showing one exemplary measurement position of the thickness a of the ion exchange membrane of the present embodiment.

FIG. 6 illustrates a schematic cross-sectional view showing one exemplary measurement position of the thickness a of the ion exchange membrane of the present embodiment.

FIG. 7 illustrates a schematic cross-sectional view showing one exemplary measurement position of the thickness b of the ion exchange membrane of the present embodiment.

FIG. 8 illustrates a schematic cross-sectional view showing one exemplary measurement position of the thickness b of the ion exchange membrane of the present embodiment.

FIG. 9 illustrates a schematic cross-sectional view showing one exemplary measurement position of the thicknesses c1 and c2 of the ion exchange membrane of the present embodiment.

FIG. 10 illustrates a schematic cross-sectional view showing one exemplary measurement position of the thicknesses c1 and c2 of the ion exchange membrane of the present embodiment.

FIG. 11 illustrates a partial enlarged view of a region A1 in FIG. 1.

FIG. 12 illustrates a partial enlarged view of a region A2 in FIG. 1.

FIG. 13 illustrates a partial enlarged view of a region A3 in FIG. 1.

FIG. 14 illustrates a conceptual view for illustrating the aperture ratio of the ion exchange membrane of the present embodiment.

FIG. 15 illustrates a schematic cross-sectional view according to a second aspect of the ion exchange membrane of the present embodiment.

FIG. 16 illustrates a conceptual view for illustrating the exposed area ratio of the ion exchange membrane of the present embodiment.

FIG. 17 illustrates a schematic cross-sectional view according to a third aspect of the ion exchange membrane of the present embodiment.

FIG. 18 illustrates a schematic cross-sectional view according to a fourth aspect of the ion exchange membrane of the present embodiment.

FIG. 19 illustrates a schematic view for illustrating a method for forming continuous holes according to the present embodiment.

FIG. 20 illustrates a schematic view showing one exemplary electrolyzer of the present embodiment.

DESCRIPTION OF EMBODIMENT

Hereinafter, an embodiment for carrying out the present invention (herein, also referred to as "the present embodiment") will be described in detail. The present invention is not intended to be limited to the following present embodiment and may be variously modified and carried out within the spirit thereof. The positional relation such as up and down, left and right, or the like is based upon the positional relation shown in the figures unless otherwise indicated. Furthermore, a size ratio in the figures is not limited to the ratio illustrated.

[Ion Exchange Membrane]

The ion exchange membrane of the present embodiment is an ion exchange membrane comprising:

a layer S comprising a fluorine-containing polymer having a sulfonic acid group;

a layer C comprising a fluorine-containing polymer having a carboxylic acid group; and a plurality of reinforcing materials functioning as at least one of reinforcement yarn and sacrifice yarn;

wherein, when the ion exchange membrane is viewed from a top surface, an average cross-sectional thickness A of the ion exchange membrane measured in pure water for a region, in which the reinforcing materials do not exist, is 20 μm or more and 75 μm or less, and wherein a strength change ratio calculated from a strength S2 of the ion exchange membrane measured after the ion exchange membrane is subjected to an electrolysis test described below and a strength S1 of the ion exchange membrane measured before the ion exchange membrane is subjected to the electrolysis test, in terms of 100×S2/S1, is 85% or more and 120% or less:

(Electrolysis Test)

A woven mesh formed by knitting a nickel fine wire having a diameter of 0.15 mm and coated with a cerium oxide and a ruthenium oxide as cathode catalysts in a sieve mesh size of 50 is used as a cathode, and a titanium expanded metal coated with a ruthenium oxide, an iridium oxide, and a titanium oxide as anode catalysts is used as an anode; the ion exchange membrane is arranged between the anode and the cathode, and further, in order to bring the cathode into close contact with the ion exchange membrane, a collector made of a nickel expanded metal is arranged on the cathode, and a mat formed by knitting a nickel fine wire is arranged between the collector and the cathode to provide a natural-circulation zero-gap electrolytic cell; four such zero-gap electrolytic cells are arranged in series for use as an electrolyzer; brine is supplied to an anode side of the electrolyzer while a concentration of the brine is adjusted to be 205 g/L, and water is supplied to a cathode side of the electrolyzer while the sodium hydroxide concentration is maintained at 32% by mass; and electrolysis is carried out for 7 days with a temperature of the electrolyzer set to 85° C., at a current density of 6 $kA/m^2$ under a condition in which a liquid pressure of the cathode side of the electrolyzer is higher than the liquid pressure of the anode side by 5.3 kPa.

The ion exchange membrane of the present embodiment, as constituted described above, can retain the strength over a long period.

FIG. 1 illustrates a schematic cross-sectional view showing one exemplary ion exchange membrane of the present embodiment. FIG. 2 illustrates a simplified perspective view showing one exemplary ion exchange membrane of the present embodiment, partially cut out, to be used for illustrating an arrangement of opening portions and continuous holes, FIG. 3 illustrates a simplified perspective view showing one exemplary ion exchange membrane of the present embodiment, partially cut out, to be used for illustrating an arrangement of reinforcement yarn, and FIGS. 2 and 3 omit optional raised portions shown in FIG. 1.

An ion exchange membrane 1 illustrated in FIG. 1 has a membrane main body 10 constituted of a layer S comprising a fluorine-containing polymer having a sulfonic acid group (10*a*) and a layer C comprising a fluorine-containing polymer having a carboxylic acid group (10*b*), and reinforcement yarn (reinforcing material) 12 arranged inside the layer S (10*a*).

In the example of FIG. 1, a plurality of raised portions 11 and a plurality of opening portions 102 are formed on the surface of the layer S (10*a*), and continuous holes 104 for connecting at least two of the opening portions 102 with each other are formed inside the layer S (10*a*). Holes 106 in FIG. 2 are formed by being cut out from the ion exchange membrane 1.

As illustrated in FIG. 1, in the ion exchange membrane of the present embodiment, the membrane main body 10 at least includes a first layer having a sulfonic acid group as an ion exchange group (sulfonic acid layer: corresponding to the above layer S) 10*a* and a second layer having a carboxylic acid group as an ion exchange group laminated on the first layer 10*a* (carboxylic acid layer: corresponding to the above layer C) 10*b*. The ion exchange membrane 1 is usually arranged such that the first layer 10*a*, which is a sulfonic acid layer, is located on the anode side of the electrolyzer (see the arrow α) and the second layer 10*b*, which is a carboxylic acid layer, is located on the cathode side of the electrolyzer (see the arrow β). The first layer 10*a* is preferably constituted of a material having low electrical resistance. The second layer 10*b* preferably has a high anion elimination property even if having a small membrane thickness. The anion elimination property referred to herein is a property of preventing infiltration and permeation of anion to the ion exchange membrane 1. The membrane thickness of the second layer 10*b* is preferably adjusted as mentioned above, from the viewpoint of reducing a reduction in the current efficiency and quality degradation of alkali hydroxide to be obtained and furthermore, allowing the resistance to damage on the cathode face to be especially satisfactory. When the membrane main body 10 has such a layer structure, the selective permeability of cations such as sodium ions tends to be further improved.

(Average Cross-Sectional Thickness of Membrane A)

The average cross-sectional thickness of membrane A is calculated as follows.

A position represented by "○" in FIG. 4 corresponds to the center of a region, in which neither reinforcement yarn nor sacrifice yarn constituting a reinforcement material exists (a window portion) when the ion exchange membrane is viewed from the top surface, and a thickness a is measured at this position. The thickness a, as shown in FIG. 5 or FIG. 6, is a thickness of the membrane measured in pure water at this position in the cross-sectional direction of the membrane. When raised portions formed only of an ion exchange resin that forms the ion exchange membrane exist on the surface of the layer S, the distance from the surface of the layer C to the base of the raised portions is taken as the thickness a.

As for a method for measuring the thickness a, a slice having a width of about 100 μm may be cut off from a cross section of a target portion of the ion exchange membrane immersed in pure water in advance by means of a razor or the like, the slice may subsequently be immersed in pure water with its cross section facing upward, and then the thickness of the slice may be measured using a microscope or the like. Alternatively, a tomographic image of a target portion of the ion exchange membrane immersed in pure water observed using X-ray CT or the like may be used to measure the thickness.

The thickness a is measured at 15 points, and the thickness of the portion having the smallest thickness is taken as a (min).

a (min) is calculated at three different positions, and the average value thereof is the thickness A.

From the viewpoint of securing sufficient membrane strength, the thickness A is 20 μm or more, and from the viewpoint of reducing the electrolytic voltage, the thickness A is 75 μm or less. From the similar viewpoints as described above, the thickness A is preferably 40 μm or more and 70 μm or less, more preferably 50 μm or more and 60 μm or less.

The thickness A can be within the aforementioned preferred range by, for example, controlling the thickness each of the layer S and the layer C, or alternatively by setting production conditions (temperature conditions and extension ratio) on production of the ion exchange membrane (in particular, on lamination of the film and reinforcing material) within an appropriate range described below or the like. More specifically, when the film temperature on lamination is increased, the thickness A tends to be smaller. When the extension ratio on extension is reduced, the thickness A tends to be larger. The temperature conditions on lamination and the extension ratio on extension are not limited to those described above and preferably adjusted as appropriate, in consideration of the flow characteristics and the like of a fluorine-containing polymer to be used.

(Average cross-sectional thickness of membrane B)

The average cross-sectional thickness of membrane B is calculated as follows.

A position represented by "Δ" in FIG. 4 corresponds to a region in which strands of the reinforcement yarn constituting a reinforcing material cross each other, and a position represented by "□" in FIG. 4 corresponds to a region at which the reinforcement yarn crosses sacrifice yarn, the both yarn constituting a reinforcing material. At both of the positions, a thickness b is measured. The thickness b, as shown in FIG. 7 or FIG. 8, is the thickness of the membrane measured in pure water at a point having the largest thickness in this region in the cross-sectional direction of the membrane. When raised portions formed only of an ion exchange resin that forms the ion exchange membrane exist on the surface of the layer S, the distance from the surface of the layer C to the base of the raised portions is taken as the thickness b. The example shown in FIG. 8 corresponds to a case in which raised portions formed with an ion exchange resin forming the ion exchange membrane and a reinforcing material exist on the surface of the layer S, and the distance from the surface of the layer C to the tip of the raised portions is taken as the thickness b.

As for a method for measuring the thickness b, a slice having a width of about 100 μm may be cut off from a cross section of a target portion of the ion exchange membrane immersed in pure water in advance by means of a razor or the like, the slice may subsequently be immersed in pure water with its cross section facing upward, and then the thickness of the slice may be measured using a microscope or the like. Alternatively, a tomographic image of a target portion of the ion exchange membrane immersed in pure water observed using X-ray CT or the like may be used to measure the thickness.

The thickness b is measured at 15 points, and the thickness of the portion having the largest thickness is taken as b (max).

b (max) is calculated at three different positions, and the average value thereof is the thickness B.

In alkali chloride electrolysis using a zero-gap base electrolyzer, the distance between the electrodes may be affected by the thickness of the ion exchange membrane. Thus, when the average cross-sectional thickness of membrane B is smaller, the resistance between electrodes tends to decrease to thereby enable an increase in the electrolytic voltage to be prevented. From such a viewpoint, the thickness B is preferably a thickness of 240 μm or less, more preferably 230 μm or less.

The thickness B can be within the aforementioned preferred range by, for example, controlling the thickness each of the layer S and the layer C or alternatively by setting the yarn diameter of the reinforcing material and the production conditions (temperature conditions and extension ratio) on production of the ion exchange membrane (in particular, on lamination of a film and a reinforcing material) within an appropriate range described below or the like. More specifically, when the outside air temperature on lamination is lowered, the thickness B tends to be smaller. When the extension ratio on extension is reduced, the thickness B tends to be larger. The temperature conditions on lamination and the extension ratio on extension are not limited to those described above and preferably adjusted as appropriate, in consideration of the flow characteristics and the like of a fluorine-containing polymer to be used.

(Thickness Ratio A/B)

A thickness ratio A/B is a value obtained by dividing the average cross-sectional thickness of membrane A by the average cross-sectional thickness of membrane B.

When A/B is smaller, the thickness of a window portion through which cations permeate tends to be smaller to thereby enable the electrolytic voltage to be reduced. Accordingly, in the ion exchange membrane of the present embodiment, A/B is preferably 0.30 or less. However, when A/B is excessively small, asperities on the surface of the membrane become large, and bubbles of the gas generated from the alkali chloride electrolysis may accumulate in the window portion, which is a recess. When gas adsorbs the surface of the ion exchange membrane, permeation of cations is prevented, and thus there is a tendency to lead to an increase in the electrolytic voltage. Accordingly, in the ion exchange membrane of the present embodiment, A/B is preferably 0.15 or more. That is, A/B is preferably 0.15 or more and 0.30 or less, more preferably 0.17 or more and 0.28 or less, still more preferably 0.19 or more and 0.26 or less, wherein, when the ion exchange membrane is viewed from the top surface, A represents an average cross-sectional thickness of the membrane measured in pure water for a region, in which the reinforcing materials do not exist, and B represents an average cross-sectional thickness of the membrane measured in pure water for a region, in which strands of the reinforcement yarn cross each other, and for a region, in which the reinforcement yarn crosses the sacrifice yarn.

(Average Cross-Sectional Thickness of Membrane C1)

The average cross-sectional thickness of membrane C1 is calculated as follows.

A position represented by "Δ" in FIG. 4 corresponds to a region, in which strands of the reinforcement yarn constituting a reinforcing material cross each other, and a thickness c1 is measured at this position. The thickness c1, as shown in FIG. 9 or FIG. 10, is a distance measured in pure water from the interface between the reinforcement yarn most distant from the surface of the layer S and the ion exchange resin to the surface of the layer S in the cross-sectional direction of the membrane. When raised portions formed only by an ion exchange resin that forms the ion exchange membrane exist on the surface of the layer S, the distance from the surface of the layer C to the base of the raised portions is taken as the thickness c1. An example shown in FIG. 10 corresponds to a case in which raised portions formed with an ion exchange resin forming the ion exchange membrane and a reinforcing material exist on the surface of the layer S, and the distance from the surface of the layer C to the tip of the raised portions is taken as the thickness c1.

As for a method for measuring the thickness c1, a slice having a width of about 100 μm may be cut off from a cross section of a target portion of an ion exchange membrane immersed in pure water in advance by means of a razor or the like, the slice may subsequently be immersed in pure water with its cross section facing upward, and then the thickness of the slice may be measured using a microscope or the like. Alternatively, a tomographic image of a target portion of an ion exchange membrane immersed in pure water observed using MRI or the like may be used to measure the thickness.

The thickness c1 is measured 15 points, and the thickness of the portion having the largest thickness is taken as c1 (max).

c1 (max) is calculated at three different positions, and the average value thereof is the thickness C1.

Cations permeating the ion exchange membrane in the alkali chloride electrolysis have a property of preferentially permeating a window portion of the ion exchange membrane having a smaller thickness. When the thickness A is equivalent to or smaller than the thickness C1, cations tend to permeate the ion exchange membrane with no influence of a shadow portion, which is to be formed behind the reinforcement yarn non-permeable to ions to limit ion permeation. From the viewpoint of further reducing the electrolytic voltage in this manner, the thickness A is preferably equivalent to or smaller than the thickness C1.

That is, in the first ion exchange membrane, A and C1 preferably satisfy the following formula: wherein C1 represents the maximum value of the distance measured in pure water between the surface of the layer S and a reinforcing yarn most distant from the surface of the layer S, in the direction of the thickness of the membrane in a region in which strands of the reinforcement yarn cross each other.

$$20\ \mu m \leq A \leq C1$$

The thickness C1 can satisfy the aforementioned relationship by, for example, setting the yarn diameter of the reinforcing material within an appropriate range described below.

(Average Cross-Sectional Thickness of Membrane C2)

The average cross-sectional thickness C2 of membrane is calculated as follows.

A position represented by "Δ" in FIG. 4 corresponds to a region, in which strands of the reinforcement yarn constituting a reinforcing material cross each other, and a thickness c2 is measured at this position. The thickness c2, as shown in FIG. 9 or FIG. 10, is a distance in this region from the interface between the reinforcement yarn most distant from the surface of the layer S and the ion exchange resin to the interface between the reinforcement yarn nearest from the surface of the layer S and the ion exchange resin, in the cross-sectional direction of the membrane.

As for a method for measuring the thickness c2, a slice having a width of about 100 μm may be cut off from a cross section of a target portion of an ion exchange membrane immersed in pure water in advance by means of a razor or the like, the slice may subsequently be immersed in pure water with its cross section facing upward, and then the thickness of the slice may be measured using a microscope or the like. Alternatively, a tomographic image of a target portion of an ion exchange membrane immersed in pure water observed using MRI or the like may be used to measure the thickness.

The thickness c2 is measured 15 points, and the thickness of the portion having the largest thickness is taken as c2 (max).

c2 (max) is calculated at three different positions, and the average value thereof is the thickness C2.

In the ion exchange membrane of the present embodiment, the thickness A is preferably equivalent to or smaller than the thickness C2 because an effect of reducing the thickness of the membrane due to continuous holes formed by sacrifice yarn is effectively exerted.

The thickness C2 can satisfy the aforementioned relationship by, for example, setting the yarn diameter of the reinforcing material within an appropriate range described below.

In the ion exchange membrane of the present embodiment, C2 is preferably 130 μm or less. C2 within this range tends to enable the electrolytic voltage to be reduced by suppressing the influence of a shadow portion, which is to be formed behind reinforcement yarn which no ion permeate to limit permeation of cations through the ion exchange membrane. From the similar viewpoint, in the ion exchange membrane of the present embodiment, C2 is more preferably 100 μm or less.

(Layer S)

In the ion exchange membrane of the present embodiment, the layer S contains a fluorine-containing polymer A having a sulfonic acid group. The fluorine-containing polymer A having a sulfonic acid group, constituting the layer S, is not limited to the following, and can be produced by copolymerizing monomers in a first group and monomers in a second group or homopolymerizing monomers in the second group, for example.

Examples of the monomer in the first group include, but not limited to, fluorinated vinyl compounds. The fluorinated vinyl compound is preferably a compound represented by the following general formula (1):

$$CF_2{=}CX_1X_2 \quad (1)$$

wherein $X_1$ and $X_2$ each independently represent F, Cl, H, or $CF_3$.

Examples of the fluorinated vinyl compound represented by the above general formula (1) include, but not limited to, vinyl fluoride, tetrafluoroethylene, hexafluoropropylene, vinylidene fluoride, trifluoroethylene, and chlorotrifluoroethylene.

Particularly, when the ion exchange membrane of the present embodiment is used as a membrane for alkali electrolysis, the fluorinated vinyl compound is preferably a perfluoro monomer, more preferably a perfluoro monomer selected from the group consisting of tetrafluoroethylene and hexafluoropropylene. Tetrafluoroethylene (TFE) is more preferred.

Examples of the monomer in the second group include, but not limited to, vinyl compounds having functional groups that can be converted to sulfone-type ion exchange groups. As such vinyl compounds having functional groups that can be converted to sulfone-type ion exchange groups, those represented by the following general formula (2) are preferred:

$$CF_2{=}CFO{-}(CF_2YFO)_a{-}(CF_2)_b{-}SO_2F \quad (2)$$

wherein a represents an integer of 0 to 2, b represents an integer of 1 to 4, Y represents F or $CF_3$, and R represents $CH_3$, $C_2H_5$, or $C_3H_7$.

Specific examples thereof include the monomers shown below;

$CF_2{=}CFOCF_2CF_2SO_2F$, $CF_2{=}CFOCF_2CF(CF_3)OCF_2CF_2SO_2F$, $CF_2{=}CFOCF_2CF(CF_3)OCF_2CF_2CF_2SO_2F$, $CF_2{=}CF(CF_2)_2SO_2F$, $CF_2{=}CFO[CF_2CF(CF_3)O]_2CF_2CF_2SO_2F$, and $CF_2{=}CFOCF_2CF(CF_2OCF_3)OCF_2CF_2SO_2F$.

Of these, $CF_2{=}CFOCF_2CF(CF_3)\ OCF_2CF_2CF_2SO_2F$ and $CF_2{=}CFOCF_2CF(CF_3)OCF_2CF_2SO_2F$ are more preferred.

The types of combination of the monomers constituting the polymer A, ratios, and degree of polymerization thereof are not particularly limited. The polymer A contained in the layer S may be a single polymer or a combination of two or more polymers. The ion exchange capacity of the fluorine-containing polymer A having a sulfonic acid group can be adjusted by changing the ratio between monomers represented by the above general formulas (1) and (2). A specific example of the adjustment described above is not particularly limited to the following and includes copolymerization of monomers represented by the above general formula (1) and monomers represented by the above general formula (2) at 4:1 to 7:1.

The layer S may be a single layer or may be a two-layer structure. When the layer S is a single layer, its thickness is preferably 50 to 180 μm, more preferably 70 to 160 μm, from the viewpoint of sufficiently achieving electrolysis performance and resistance to damage of layer C on a conductive surface (hereinafter, may be simply referred to as "damage"). When the layer S has a two-layer structure, a layer to be in contact with the anode is referred to as a layer S-1, a polymer forming the layer S-1 as a fluorine-containing polymer A-1, a layer to be in contact with the layer C as a layer S-2, and a polymer forming the layer S-2 as a fluorine-containing polymer A-2. The thickness of the layer S-1 is preferably 10 to 60 μm from the viewpoint of sufficiently achieving electrolysis performance and resistance to the damage, and the thickness of the layer S-2 is preferably 30 to 120 μm, more preferably 40 to 100 μm from the viewpoint of sufficiently achieving electrolysis performance and resistance to the damage. From the viewpoint of retaining the strength of the membrane main body higher than a predetermined level, it is preferred to adjust the thickness of the layer S as mentioned above. The thickness of the layer S, which is a value obtained by measurement on an ion exchange membrane in a dry state by a routine method (e.g., an extruded film is sliced with a single-edged razor blade, and the sliced film is observed with an optical microscope), can be controlled to be in the range described above, for example, by employing preferable production conditions described below.

(Layer C)

In the ion exchange membrane of the present embodiment, the layer C contains a fluorine-containing polymer B having a carboxylic acid group. The fluorine-containing polymer having a carboxylic acid group, constituting the layer C, is not limited to the following and can be produced by copolymerizing monomers in the first group described above and monomers in a third group described below or by homopolymerizing monomers in the third group, for example.

Examples of the monomer in the third group include, but not limited to, vinyl compounds having functional groups that can be converted to carboxylic acid-type ion exchange groups. As such vinyl compounds having functional groups that can be converted to carboxylic acid-type ion exchange groups, those represented by the following general formula (3) are preferred:

$$CF_2{=}CF(OCF_2CYF)_c{-}O(CF_2)_d{-}COOR \quad (3)$$

wherein c represents an integer of 0 to 2, d represents an integer of 1 to 4, Y represents F or $CF_3$, and R represents $CH_3$, $C_2H_5$, or $C_3H_7$.

In the above general formula (3), it is preferred that Y be $CF_3$ and R be $CH_3$.

Particularly, when the ion exchange membrane of the present embodiment is used as an ion exchange membrane for alkali electrolysis, it is preferred to use at least perfluoro monomers as monomers in the third group. However, the alkyl group in the ester group (see the above R) is eliminated from the polymer on hydrolysis, and thus, the alkyl group (R) may not be a perfluoro alkyl group in which all the hydrogen atoms are replaced by fluorine atoms. Of these, monomers shown below are more preferred, for example:

$$CF_2{=}CFOCF_2CF(CF_3)OCF_2COOCH_3,$$

$$CF_2{=}CFOCF_2CF(CF_3)O(CF_2)_2COOCH_3,$$

$$CF_2{=}CF[OCF_2CF(CF_3)]_2O(CF_2)_2COOCH_3,$$

$$CF_2{=}CFOCF_2CF(CF_3)O(CF_2)_3COOCH_3,$$

$$CF_2{=}CFO(CF_2)_2COOCH_3, \text{ and}$$

$$CF_2{=}CFO(CF_2)_3COOCH_2.$$

The monomers in the third group may be used singly or two or more of these may be used in combination. In the latter case, monomers other than those described above may be used in combination. Examples thereof include those represented by the general formula (2). The mixing form of the monomers are not particularly limited. A fluorine-containing copolymer obtained by copolymerizing monomers in the first group and monomers in the third group and a fluorine-containing copolymer obtained by copolymerizing monomers in the first group and monomers not in the third group may be each simply mixed, or monomers in the first group, monomers in the third group, and monomers not in the third group may be copolymerized.

The types of combination of the monomers constituting the polymer B, ratios, and degree of polymerization thereof are not particularly limited. The polymer B contained in the layer C may be a single polymer or a combination of two or more polymers. The ion exchange capacity of the fluorine-containing polymer B having a carboxylic acid group can be adjusted by changing the ratio of the monomers represented by the above general formulas (1) and (3). More specifically, an example of adjustment includes copolymerization of monomers represented by the above general formula (1) and monomers represented by the above general formula (3) at 6:1 to 9:1.

As fluorine-containing polymers B that may be employed in the present embodiment, in addition to those mentioned above, various known configurations such as the fluorine-containing polymer described in Japanese Patent Laid-Open No. 2020-100816 may be employed.

In the ion exchange membrane of the present embodiment, the thickness of the layer C Tc is preferably 5 μm or more and 40 μm or less, more preferably 10 μm or more and 40 μm or less, still more preferably 10 μm or more and 20 μm or less, from the viewpoint of sufficiently achieving electrolysis performance and resistance to the damage. The thickness of the layer C Tc, which is a value obtained by measurement on an ion exchange membrane in a dry state by a routine method (e.g., an extruded film is sliced with a single-edged razor blade, and the sliced film is observed with an optical microscope), can be controlled to be in the range described above, for example, by employing preferable production conditions described below.

In the present embodiment, the ratio of the thickness of the layer C Tc to the average cross-sectional thickness of the membrane A, Tc/A, is preferably 0.165 or more and 0.508 or less, more preferably 0.190 or more and 0.406 or less, still more preferably 0.216 or more and 0.356 or less, from the viewpoint of retention of the strength for a long period.

(Raised Portion)

As shown in FIG. 1, a plurality of raised portions 11 is preferably formed on the surface of the layer S (10*a*). In the ion exchange membrane of the present embodiment, raised portions are formed on the surface of the layer S (10*a*). It is preferred that the height be 20 μm or more and the arrangement density on the surface of the layer S (10*a*) be 20 to 1500 raised portions/$cm^2$, as viewed in a cross section. A raised portion referred to herein is a portion having a height of 20 μm or more from a reference point, which is a point having the smallest height on the surface of the layer S (10*a*). The arrangement density of the raised portions per $cm^2$ of the surface of the ion exchange membrane 1 is preferably 20 to 1500 raised portions/$cm^2$, more preferably 50 to 1200 raised portions/$cm^2$ from the viewpoint of sufficiently supplying an electrolyte solution to the membrane. Additionally, the total area of the raised portions is preferably 0.01 $cm^2$ to 0.6 $cm^2$ per $cm^2$ of the surface of the layer S from the viewpoint of increasing the amount of salt water to be supplied and reducing the damage. The height and arrangement density of the raised portions can be controlled to be in the range described above, for example, by employing preferable production conditions described below. For the control described above, the production conditions described in Japanese Patent Nos. 4573715 and 4708133 can be employed.

The height, shape, and arrangement density of the raised portions describe above each can be measured and checked by the following method. First, in an area of a 1000-μm square of the surface of the ion exchange membrane, a point having the smallest height is taken as the reference. Then, portions having a height of 20 μm or more from the reference point are taken as raised portions. The height of the raised portions is measured using a "Color 3D Laser Microscope (VK-9710)" manufactured by KEYENCE CORPORATION. Specifically, a piece of 10 cm×10 cm is optionally cut out from the ion exchange membrane in a dry state. The cathode side of the ion exchange membrane is fixed on a flat plate with double-sided tape, and the membrane is mounted on the measuring stage such that the anode side of the ion exchange membrane faces the measuring lens. The shape on the surface of the ion exchange membrane is measured in a 1000-μm square measuring area of each 10 cm×10 cm membrane. A point having the smallest height is taken as the reference, and the height from the reference is measured to thereby enable raised portions to be observed.

The arrangement density of raised portions is a value obtained by optionally cutting out three 10 cm×10 cm membranes from the ion exchange membrane, carrying out measuring at nine points across a 1000-μm square measuring area of each 10 cm×10 cm membrane, and averaging the measured values.

The shape of the raised portions is not particularly limited, and the raised portions preferably have at least one shape selected from the group consisting of conical, polygonally pyramidal, truncated conical, truncated polygonally pyramidal, and hemispherical shapes. The hemispherical shape referred to herein also includes a shape referred to as a centroclinal shape.

(Opening Portion and Continuous Hole)

In the ion exchange membrane of the present embodiment, preferably, a plurality of opening portions 102 is formed on the surface of the layer S (10$a$), and continuous holes 104 for connecting the opening portions 102 with each other are formed inside the layer S (10$a$) (see FIG. 2). The continuous holes 104 are holes that may serve as a flow path for cations generated on electrolysis and an electrolyte solution. Forming the continuous holes 104 inside the layer S (10$a$) can ensure the mobility of cations generated on electrolysis and an electrolyte solution. The shape of the continuous holes 104 is not particularly limited, and the continuous holes 104 each may take an appropriate and suitable shape.

Opening portions are formed on the surface of the membrane and continuous holes for connecting the opening portions with each other inside the membrane are formed to thereby supply an electrolyte solution inside the ion exchange membrane on electrolysis. Since this changes the concentration of impurities inside the membrane, the amount of impurities accumulated inside the membrane tends to decrease. When metal ions generated from elution of the cathode or impurities contained in an electrolyte solution supplied to the cathode side of the membrane infiltrate inside the membrane, the impurities become likely to be emitted from the membrane because opening portions are formed on the surface of the membrane. Thus, the amount of impurities accumulated tends to decrease. That is, the ion exchange membrane of the present embodiment, when having a configuration as described above, tends to have improved resistance against impurities existing in the electrolyte solution on the anode side of the membrane and additionally against impurities generated on the cathode side of the membrane.

When the alkali chloride aqueous solution is not sufficiently supplied, the damage is known to occur on the layer near the cathode of the membrane. The opening portions in the present embodiment can improve the supplying performance of the alkali chloride aqueous solution and reduce the damage occurring on the cathode face of the membrane main body.

The opening portions 102 formed on the surface of the layer S (10$a$) are a portion of the continuous hole 104 that is open on one surface of the membrane main body 10. Being open referred to herein means that the continuous hole is open outward from the surface of the layer S (10$a$). For example, when the surface of the layer S (10$a$) is coated with a coating layer described below, an open-hole area on which the continuous hole 104 are open outward on the surface of the layer S (10$a$) from which the coating layer has been removed is referred to as an opening portion.

The opening portions 102 may be formed on the surface of the layer S (10$a$) and may be formed also on both the surfaces of the membrane main body 10 (that is, on the surface of the layer C (10$b$)). The arrangement interval and shape of the opening portions 102 on the surface of the layer S (10$a$) are not particularly limited, and appropriate and suitable conditions can be selected, in consideration of the shape and performance of the membrane main body 10 and operating conditions on electrolysis.

The continuous holes 104 are preferably formed so as to alternately penetrate through the layer S (10$a$) side (the (α) side in FIG. 1) and through the layer C (10$b$) side (the (β) side in FIG. 1) of the reinforcement yarn 12. Such a structure enables the electrolyte solution flowing in the space of the continuous holes 104 and cations (for example, sodium ions) contained in the electrolyte solution to be transferred between the anode side and the cathode side of the membrane main body 10. As a result, interruptions of the flow of cations in the ion exchange membrane 1 on electrolysis are reduced, and thus, there is a tendency to enable the electrical resistance of the ion exchange membrane 1 to be further reduced.

Specifically, as shown in FIG. 1, as viewed in a cross section, the continuous holes 104 formed in the up-and-down direction in FIG. 1 are preferably arranged alternately on the layer S (10$a$) side (the (α) side in FIG. 1) and the layer C (10$b$) side (the (β) side in FIG. 1) with respect to the reinforcement yarn 12 of which cross sections are shown, from the viewpoint of exerting more stable electrolytic performance and strength. Specifically, it is preferred that the continuous hole 104 be arranged on the layer S (10$a$) side of the reinforcement yarn 12 in a region A1 and the continuous holes 104 be arranged on the layer C (10$b$) side of the reinforcement yarn 12 in a region A4.

The continuous holes 104, in FIG. 2, are each formed along the up-and-down direction and the right-and-left direction of the paper. That is, the continuous holes 104 formed along the up-and-down direction of FIG. 2 connect a plurality of opening portions 102 formed on the surface of the membrane main body 10 with each other in the up-and-down direction. The continuous holes 104 formed along the right-and-left direction of FIG. 2 connect a plurality of opening portions 102 formed on the surface of the membrane main body 10 with each other in the right-and-left direction. In the present embodiment, the continuous holes 104 may be formed along only one predetermined direction of the membrane main body 10 in this manner, but, from the viewpoint of exerting more stable electrolytic performance, the continuous holes 104 are preferably arranged both in the longitudinal direction and the lateral direction of the membrane main body 10.

It is only required that continuous holes 104 connect at least two or more opening portions 102, and the positional relation between the opening portions 102 and the continuous holes 104 is not limited. One example of the opening portions 102 and continuous hole 104 is described herein using FIG. 11, FIG. 12, and FIG. 13. FIG. 11 is a partial enlarged view of a region A1 in FIG. 1, FIG. 12 is a partial enlarged view of a region A2 in FIG. 1, and FIG. 13 is a partial enlarged view of a region A3 in FIG. 1. The regions A1 to A3 respectively shown in FIGS. 11 to 13 are regions where the opening portions 102 are provided in the ion exchange membrane 1.

In the region A1 in FIG. 11, a portion of the continuous hole 104 formed along the up-and-down direction of FIG. 1 is open on the surface of the membrane main body 10 to thereby form the opening portion 102. Behind the continuous hole 104, the reinforcement yarn 12 is arranged. The place where the opening portion 102 is provided is lined with the reinforcement yarn 12. This lining can prevent occurrence of a crack on the membrane starting from the opening portion when the membrane is bent, and thus, the mechanical strength of the ion exchange membrane 1 tends to be further improved.

In the region A2 in FIG. 12, a portion of the continuous hole 104 formed along the vertical direction to the paper of FIG. 1 (i.e., the direction corresponding to the right-and-left direction in FIG. 2) is exposed on the surface of the membrane main body 10 to thereby form the opening portion 102. Additionally, the continuous hole 104 formed along the vertical direction to the paper of FIG. 1 crosses the continuous hole 104 formed along the up-and-down direction of FIG. 1. As described above, when the continuous hole 104 is formed along two directions (e.g., the up-and-down direction and right-and-left direction in FIG. 2, etc.), the opening portion 102 is preferably formed at the point at which these continuous holes cross each other. This allows the electrolyte solution to be supplied to both the continuous hole along the up-and-down direction and the continuous hole along right-and-left direction, and thus, the electrolyte solution is likely to be supplied inside the entire ion exchange membrane. This changes the concentration of impurities inside the membrane, and the amount of impurities accumulated inside the membrane tends to further decrease. When metal ions generated from elution of the cathode or impurities contained in an electrolyte solution supplied to the cathode side of the membrane infiltrate inside the membrane, both impurities carried through the continuous hole 104 formed along the up-and-down direction and impurities carried through the continuous hole 104 formed along the right-and-left direction can be emitted through the opening portion 102. From such a viewpoint, the amount of impurities accumulated tends to further decrease.

In the region A3 in FIG. 13, a portion of the continuous hole 104 formed along the up-and-down direction of FIG. 1 is exposed on the surface of the membrane main body 10 to thereby form the opening portion 102. Additionally, the continuous hole 104 formed along the up-and-down direction to the paper of FIG. 1 crosses the continuous hole 104 formed along the vertical direction to the paper of FIG. 1 (i.e., the direction corresponding to the right-and-left direction in FIG. 2). Also in the region A3, similarly to the region A2, the electrolyte solution is supplied to both the continuous hole along the up-and-down direction and the continuous hole along right-and-left direction, and thus, the electrolyte solution is likely to be supplied inside the entire ion exchange membrane. This changes the concentration of impurities inside the membrane, and the amount of impurities accumulated inside the membrane tends to further decrease. When metal ions generated from elution of the cathode or impurities contained in an electrolyte solution supplied to the cathode side of the membrane infiltrate inside the membrane, both impurities carried through the continuous hole 104 formed along the up-and-down direction and impurities carried through the continuous hole 104 formed along the right-and-left direction can be emitted through the opening portion 102. From such a viewpoint, the amount of impurities accumulated tends to further decrease.

(Reinforcing Material)

The ion exchange membrane of the present embodiment has a reinforcing material. In the present embodiment, the reinforcing material is constituted of reinforcement yarn and sacrifice yarn. Examples thereof include, but not limited to, fabric formed by weaving reinforcement yarn and sacrifice yarn. The reinforcement yarn, which can stably exist inside the ion exchange membrane 1 by embedding the reinforcing material in the membrane, imparts desired mechanical strength and dimension stability to the ion exchange membrane. The sacrifice yarn is eluted in a step (5) described below to thereby form a continuous hole. The amount of the sacrifice yarn mix-woven is preferably 10 to 80% by mass, more preferably 30 to 70% by mass based on the total reinforcing material. The sacrifice yarn may be in a monofilament or multifilament form, preferably in a multifilament form. The sacrifice yarn preferably has a thickness of 20 to 50 deniers. The sacrifice yarn may be made of any raw material that is dissolved in the step (5) described below, and is preferably made of polyester such as polyethylene terephthalate (PET).

In the present embodiment, the arrangement of the reinforcing material is not particularly limited, and there is a tendency to enable the ion exchange membrane 1 to expand and contract within a desired range particularly by disposing the reinforcement yarn 12 inside the layer S (10*a*). Such an ion exchange membrane does not expand and contract more than required on electrolysis and the like and tends to be able to maintain excellent dimension stability for a long period.

The configuration of the reinforcement yarn 12 in the present embodiment is not particularly limited, and yarn formed by spinning reinforcement yarn can be used. Use of such yarn formed by spinning reinforcement yarn can impart further excellent dimension stability and mechanical strength to the ion exchange membrane 1.

The materials of the reinforcement yarn are not particularly limited and are preferably materials resistant to acid and alkali. From the viewpoint of imparting long-term heat resistance and chemical resistance, those containing a fluorine-containing polymer are more preferred. Examples of the fluorine-containing polymer include, but not limited to, polytetrafluoroethylene (PTFE), tetrafluoroethylene-perfluoro alkyl vinyl ether copolymers (PFA), tetrafluoroethylene-ethylene copolymers (ETFE), tetrafluoroethylene-hexafluoropropylene copolymers, trifluorochlorethylene-ethylene copolymers, and vinylidene fluoride polymers (PVDF). Of these, polytetrafluoroethylene (PTFE) is preferred, from the viewpoint of heat resistance and chemical resistance.

The yarn diameter of the reinforcement yarn is not particularly limited and is preferably 20 to 150 deniers, more preferably 50 to 120 deniers. The weaving density (fabric count per unit length) of the reinforcement yarn is not particularly limited and preferably 5 to 50 strands/inch. The form of the reinforcement yarn is not particularly limited, and woven fabric, non-woven fabric, knitted fabric or the like is used, for example. Of these, it is preferred that the form be woven fabric. The thickness of the woven fabric is not particularly limited and is preferably 30 to 150 μm, more preferably 30 to 100 μm.

In the present embodiment, the reinforcement yarn 12 may be monofilament or multifilament. Additionally, such yarn, slit yarn or the like is preferably used.

The weaving method and arrangement for the reinforcement yarn 12 in the layer S (10*a*) are not particularly limited. An appropriately and suitably arrangement can be employed in consideration of the size and shape of the ion exchange membrane 1, physical properties required for the ion exchange membrane 1, an environment of usage and the like. For example, the reinforcement yarn 12 may be arranged along a predetermined direction of the layer S (10*a*). From the viewpoint of the dimension stability, it is preferred that a strand of the reinforcement yarn 12 be arranged along a predetermined first direction and another strand of the reinforcement yarn 12 be arranged along a second direction substantially perpendicular to the first direction (see FIG. 3). A plurality of strands of the reinforcement yarn is arranged inside the longitudinal-direction layer S (10*a*) of the membrane main body so as to be substantially orthogonal to one another. This tends to impart further excellent dimension stability and mechanical strength in many directions. For example, an arrangement is preferred in which the reinforcement yarn 12 arranged along the longitudinal direction (warps) is interwoven with the reinforcement yarn 12 arranged along the lateral direction (wefts) on the surface of layer S (10*a*). The arrangement described above is more preferably in the form of plain weave driven and woven by allowing warps and wefts to run over and under each other alternately, leno weave in which two warps are woven into wefts while twisted, basket weave driven and woven by inserting, into warps aligned and arranged in groups of two or several, wefts of the same number or the like, from the viewpoint of dimension stability, mechanical strength, and easy-production.

Particularly, the reinforcement yarn 12 is preferably arranged along both the MD (Machine Direction) and the TD (Transverse Direction) of the ion exchange membrane 1. That is, the reinforcement yarn 12 is preferably plain-woven in the MD and the TD. The MD herein refers to the direction in which the membrane main body and reinforcing material are carried (flow direction) in the production step of ion exchange membrane described below, and the TD refers to the direction substantially perpendicular to the MD. Yarn woven along the MD is referred to as MD yarn, and yarn woven along the TD is referred to as TD yarn. The ion exchange membrane used in electrolysis is usually rectangular. Thus, frequently, its longitudinal direction is the MD, and the width direction is the TD. By interweaving the reinforcement yarn 12 which is MD yarn into the reinforcement yarn 12 which is TD yarn, further excellent dimension stability and mechanical strength tend to be imparted in many directions.

The arrangement interval for the reinforcement yarn 12 is not particularly limited. The reinforcement yarn can be appropriately and suitably arranged in consideration of physical properties required for the ion exchange membrane 1, an environment of usage and the like.

As reinforcing materials that may be employed in the present embodiment, in addition to those mentioned above, various known configurations such as the reinforcing material described in Japanese Patent Laid-Open No. 2019-108607 may be employed.

(Aperture Ratio)

In the ion exchange membrane of the present embodiment, the aperture ratio of the reinforcement yarn 12 is not particularly limited and is preferably 30% or more, more preferably 50% or more and 90% or less. The aperture ratio is preferably 30% or more from the viewpoint of the electrochemical properties of the ion exchange membrane 1 and preferably 90% or less from the viewpoint of the mechanical strength of the ion exchange membrane 1.

The aperture ratio referred to herein is a ratio of a total area of a surface through which substances such as ions (an electrolyte solution and cations contained therein (e.g., sodium ions)) can pass (B) to the projected area of either one surface of the membrane main body 10(A) (B/A). The total area of a surface through which substances such as ions can pass (B) can be the sum of the projected area of the region in the ion exchange membrane 1 in which the cations, electrolyte solution, and the like are not interrupted by the reinforcement yarn 12 included in the ion exchange membrane 1 or the like.

FIG. 14 illustrates a conceptual view for illustrating the aperture ratio of the ion exchange membrane of the present embodiment. FIG. 14, in which a portion of the ion exchange membrane 1 is enlarged, shows only the arrangement of the reinforcement yarn 12 in the regions, omitting illustration of the other members. Then, subtraction of the total projected area of the reinforcement yarn 12(C) from the projected area of the ion exchange membrane including the reinforcement yarn 12 arranged along the longitudinal direction and the reinforcement yarn 12 arranged along the lateral direction (A) can determine the total area of the region through which substances such as ion can pass (B) in the area of the region described above (A). That is, the aperture ratio can be determined by the following formula (I):

$$\text{Aperture ratio}=(B)/(A)=((A)-(C))/(A) \tag{I}$$

Of these forms of reinforcement yarn 12, particularly preferred forms are preferably tape yarn and highly-oriented monofilaments containing PTFE from the viewpoint of heat resistance and chemical resistance. Specifically, the reinforcement yarn is more preferably formed by plain-weaving using 50 to 300 deniers of tape yarn obtained by slitting a high-strength porous sheet made of PTFE into a tape form or a highly-oriented monofilament made of PTFE at a weaving density of 10 to 50 strands/inch, having a thickness in the range of 50 to 100 μm. The aperture ratio of the ion exchange membrane including such reinforcement yarn is preferably 60% or more.

The shape of the reinforcement yarn is not particularly limited, and examples thereof include round yarn and tape yarn. These shapes are not particularly limited.

(Opening Area Ratio)

The ion exchange membrane 1 of the present embodiment preferably has a proportion of the total area of the opening portions 102 based on the area of the surface of the layer S (10*a*) on which the opening portions 102 are formed (opening area ratio) of 0.4 to 15%. When the opening area ratio is limited to such a range, impurities in the electrolyte solution have a minor influence on the electrolytic performance, and stable electrolytic performance can be exerted. When the opening area ratio is 0.4% or more, an increase in the electrolytic voltage, a decrease in the current efficiency, and a decrease in the purity of the product to be obtained, which are caused by infiltration of impurities contained in the electrolyte solution into the ion exchange membrane 1 and accumulation of the impurities inside the membrane main body 10, tend to be more reduced. When the opening area ratio of the present embodiment is 15% or less, a decrease in the strength of the membrane and exposure of the reinforcement yarn tend to be more reduced. That is, when the ion exchange membrane 1 of the present embodiment is adjusted to be in the range described above, an emission flow from the continuous holes 104 via the opening portions 102 to outside the membrane can be facilitated even when impurities are accumulated inside the membrane main body 10. Thus, the impurities have a minor influence on the electrolytic performance, and stable electrolytic performance can be exerted for a long period.

Particularly, in alkali chloride electrolysis, alkali chloride used as an anode liquid and alkali hydroxide used as a cathode liquid contain metal compounds, metal ions, and impurities such as organic substances. Thus, such impurities have a major influence on the electrolytic voltage and current efficiency in alkali chloride electrolysis. When the opening area ratio of the ion exchange membrane 1 of the present embodiment is adjusted to be in the range described above, however, the electrolyte solution is likely to be supplied inside the ion exchange membrane on electrolysis. This changes the concentration of the impurities inside the membrane, and the amount of the impurities accumulated inside the membrane can be reduced. When metal ions generated from elution of the cathode or impurities contained in the electrolyte solution supplied to the cathode side of the membrane infiltrate inside the membrane, the impurities described above are allowed to permeate via the opening portions 102 and the continuous holes 104 to outside the membrane main body 10 with no difficulty. For this reason, the influence of the impurities generated during alkali chloride electrolysis on the electrolytic performance can be reduced, and stable electrolytic performance can be maintained for a long period. Additionally, the concentration of the impurities (alkali chloride and the like) in alkali hydroxide, which is the product, also can be prevented from increasing. From the viewpoint of reducing the influence of the impurities on the electrolytic performance in the ion exchange membrane 1 of the present embodiment and maintaining a constant strength of the membrane, the opening area ratio of the opening portions 102 is more preferably 0.5 to 10%, still more preferably 0.5 to 5%. The opening area ratio described above can be checked by a method described in Examples and can be controlled to be in the range described above, for example, by employing preferable production conditions described below.

In the present embodiment, the opening area ratio of opening portions is the ratio of the area of the opening portions to the projected area, when the ion exchange membrane is viewed from the top surface, on the surface of the ion exchange membrane.

(Opening Density)

In the ion exchange membrane 1 of the present embodiment, the opening density of the opening portions 102 on the surface of the layer S (10*a*) is not particularly limited, and is preferably 10 to 1000 opening portions/cm$^2$, more preferably 20 to 800 opening portions/cm$^2$. The opening density referred to herein is the number of opening portions 102 formed on 1 cm$^2$ of the surface of the layer S (10*a*) on which the opening portions 102 are formed. It should be noted that 1 cm$^2$ of the surface of the layer S (10*a*) is the projected area when the layer S (10*a*) is viewed from the top surface. When the opening density of the opening portions 102 is 10 opening portions/cm$^2$ or more, the average area per opening portion 102 can be appropriately smaller, and thus can be sufficiently smaller than the size of a hole (pinhole) from which a crack, which is a cause of a reduction in the strength of the ion exchange membrane 1, may occur. When the opening density of the opening portions 102 is 1000 opening portions/cm$^2$ or less, the average area per opening portion 102 has a size large enough to allow metal ions and cations contained in the electrolyte solution to infiltrate the continuous holes 104, and thus, the ion exchange membrane 1 tends to supply metal ions and cations or to allow metal ions and cations to permeate more efficiently. The opening density described above can be controlled to be in the range described above, for example, by employing preferable production conditions described below.

(Exposed Area Ratio)

FIG. 15 illustrates a schematic cross-sectional view of a second aspect of the ion exchange membrane of the present embodiment. In the present embodiment, as shown in the ion exchange membrane 2 in FIG. 15, exposed portion A5, which is a portion of the reinforcement yarn 22 exposed, may be formed on the surface of the membrane main body 20 on which raised portions 21 and opening portions 202 are formed. In the present embodiment, the exposed portion is preferably smaller. That is, an exposed area ratio described below is preferably 5% or less, more preferably 3% or less, further preferably 1% or less. Most preferably, the exposed area ratio is 0%, that is, no exposed portion is formed. The exposed portion A5 herein refers to a site at which the reinforcement yarn 22 is externally exposed from the surface of the membrane main body 20. For example, when the surface of the membrane main body 20 is coated with a coating layer described below, the exposed portion A5 refers to a region from which the reinforcement yarn 22 is externally exposed on the surface of the membrane main body 20 after the coating layer is removed. When the exposed area ratio is 5% or less, there is a tendency to reduce an increase in the electrolytic voltage and to more reduce an increase in the concentration of chloride ions in alkali hydroxide to be obtained. The exposed area ratio described above is calculated by the following formula, and can be controlled to be in the range described above, for example, by employing preferable production conditions described below:

Exposed area ratio (%)=(Sum of projected area of the exposed portions, which are portions of the reinforcement yarn exposed when the surface of the membrane main body is viewed from the top surface)/(Projected area of the surface of the membrane main body)×100.

In the present embodiment, the reinforcement yarn 22 preferably contains a fluorine-containing polymer such as polytetrafluoroethylene (PTFE). When the reinforcement yarn 22 constituted of a fluorine-containing polymer is exposed on the surface of the membrane main body 20, the surface of the exposed portion A5 may exhibit hydrophobicity. When electrolytically generated gas in a solution state and cations are adsorbed on the exposed portion, which is hydrophobic, membrane permeation of the cations may be inhibited. In such a case, the electrolytic voltage increases, and the concentration of chloride ions in alkali hydroxide to be obtained may also increase. In the present embodiment, setting the exposed area ratio to 5% or less enables the existence ratio of the hydrophobic exposed portion to be in an appropriate range, and the increase in the electrolytic voltage and the increase in chloride ions in alkali hydroxide described above tend to be effectively reduced.

Furthermore, electrolytically generated gas in a solution state and impurities in the electrolyte solution such as metal ions adsorb the exposed portions, infiltrate inside the membrane main body 20, and permeate the membrane, becoming impurities in sodium hydroxide. In the present embodiment, setting the exposed area ratio to 3% or less tends to more effectively reduce adsorption, infiltration, and permeation of the impurities, and thus, tends to enable more highly pure sodium hydroxide to be produced.

Particularly, in the ion exchange membrane 2 of the present embodiment, since the opening area ratio described above is 0.4 to 15% and the exposed area ratio described above is 5% or less, a decrease in the current efficiency due to impurities can be further reduced. In the case of alkali electrolysis, the concentration of the impurities in sodium hydroxide, which is a product, tends to be maintained lower. Furthermore, an increase in the electrolytic voltage is also reduced, and thus, there is a tendency to enable more stable electrolytic performance to be exerted.

In the present embodiment, the exposed area ratio of the exposed portions is the sum of the projected area of the exposed portions formed on the reinforcement yarn based on the sum of the projected area of the reinforcement yarn, when viewed from the top surface. The exposed area ratio will be an index that indicates how much the reinforcement yarn included in the ion exchange membrane is exposed. Accordingly, the exposed area ratio of the exposed portions can be directly calculated by determining the projected area of the reinforcement yarn and the projected area of the exposed portions, and also can be calculated using the aperture ratio described above by the following formula (II). A more specific description now will be given with reference to the drawings. FIG. 16 illustrates a conceptual view for illustrating the aperture ratio of the ion exchange membrane of the present embodiment. FIG. 16, in which a portion of the ion exchange membrane 2, as viewed from the top surface, is enlarged, only shows the arrangement of the reinforcement yarn 22, omitting illustration of the other members. In FIG. 16, a plurality of exposed portions A5 is formed on the surface of the reinforcement yarn 22 arranged along the longitudinal direction and the reinforcement yarn 22 arranged along the lateral direction. Herein, the sum of the projected area of exposed portions A5, as viewed from the top surface, is taken as Sa, and the sum of the projected area of the reinforcement yarn 22 is taken as Sb. Then, the exposed area ratio is represented by Sa/Sb, and the formula (II) can be derived using the above-mentioned formula (I) as described below.

The exposed area ratio is Sa/Sb.

Herein, on the basis of the above formula (I), Sb=C=A—B=A(1−B/A)=A(1−aperture ratio) is established, and thus, resulting in $$\text{Exposed area ratio}=Sa/(A(1-\text{aperture ratio})) \quad \text{(II)},$$

wherein

Sa: sum of the projected area of the exposed portions A5,

Sb: sum of the projected area of the reinforcement yarn 22,

A: projected area of the ion exchange membrane including the reinforcement yarn 22 arranged along the longitudinal direction and the reinforcement yarn 12 (22) arranged along the lateral direction (see FIG. 14), B: total area of the region through which substances such as ions can pass (B) (see FIG. 14), and C: total area of the reinforcement yarn 22.

As shown in FIG. 15, the ion exchange membrane 2 of the present embodiment includes a membrane main body 20 constituted of a layer S (20*a*) and a layer C (20*b*) and reinforcement yarn 22 inside the layer S (20*a*), and on the surface of the layer S (20*a*) on which opening portions 202 are formed, raised portions 21 having a height of 20 μm or more are formed, as viewed in a cross section. As described above, in the present embodiment, when the vertical direction with respect to the surface of the layer S (20*a*) is taken as the height direction (e.g., see the arrow α and the arrow β in FIG. 15), the surface having opening portions 202 preferably has raised portions 21. The layer S (20*a*), which has the opening portions 202 and raised portions 21, allows the electrolyte solution to be sufficiently supplied to the membrane main body 20 on electrolysis, and thus, the influence of impurities can be more reduced.

Additionally, the opening portions 202, exposed portions, and raised portions 21 are more preferably formed on the surface of the layer S (20*a*). Usually, the ion exchange membrane is used in close contact with the anode for the purpose of reducing the electrolytic voltage. However, when the ion exchange membrane comes in close contact with the anode, the electrolyte solution (the anode liquid such as brine) becomes unlikely to be supplied. Then, since the raised portions have been formed on the surface of the ion exchange membrane, the close contact of the ion exchange membrane with the anode can be suppressed to thereby enable the electrolyte solution to be smoothly supplied. As a result, metal ions or other impurities can be prevented from accumulating in the ion exchange membrane, the concentration of chloride ions in alkali hydroxide to be obtained is reduced, and then, the damage of the cathode surface of the membrane can be reduced.

(Coating Layer)

The ion exchange membrane of the present embodiment preferably further has a coating layer with which at least a portion of at least one surface of the membrane main body is coated, from the viewpoint of preventing adsorption of gas on the cathode side surface and the anode side surface on electrolysis. FIG. 17 illustrates a schematic cross-sectional view of a third aspect of the ion exchange membrane of the present embodiment. The ion exchange membrane 3 includes a membrane main body 30 constituted of a layer S (30*a*) and a layer C (30*b*) and has reinforcement yarn 32 arranged inside the membrane main body 30. On the surface of layer S (30*a*) side (see the arrow α) of the membrane main body 30, a plurality of raised portions 31 is formed and a plurality of opening portions 302 is formed, and a continuous hole 304 for connecting at least two of the opening portions 302 with one another is formed inside the membrane main body 30. Additionally, the surface of the layer S (30*a*) (see the arrow α) is coated with a coating layer 34*a*, and the surface of the layer C (30*b*) (see the arrow β) is coated with a coating layer 34*b*. That is, the ion exchange membrane 3 is a membrane formed by coating the surfaces of the membrane main body of the ion exchange membrane 1 shown in FIG. 1 with the coating layers. Coating each of the surfaces of the membrane main body 30 with the coating layers 34*a* or 34*b* can prevent gas generated on electrolysis from adsorbing the membrane surfaces. This can further improve the membrane permeability of the cations, and thus, the electrolytic voltage tends to be further reduced.

The raised portions 31 and the opening portions 302 may or may not be completely coated with the coating layer 34*a*.

That is, the raised portions 31 and the opening portions 302 may be visually observable from the surface of the coating layer 34*a*.

The materials constituting the coating layers 34*a* and 34*b* are not particularly limited and preferably contain minerals from the viewpoint of prevention of gas adsorption. The inorganic substance is not particularly limited, and examples include zirconium oxide and titanium oxide. As a method for forming the coating layers 34*a* and 34*b* on the surfaces of the membrane main body 30, known methods can be employed, without particular limitation. An example thereof is a method for applying a liquid prepared by dispersing fine particulates of inorganic oxide in a binder polymer solution by spraying or the like (spray method). Examples of the binder polymer include, but not limited to, vinyl compounds having functional groups that can be converted to sulfone-type ion exchange groups. The application conditions are not particularly limited, and spraying can be used at 60° C., for example. Examples of methods other than the spray method include, but not limited to, roll coating.

The coating layer 34*a* is laminated on the surface of the layer S (30*a*). In the present embodiment, the opening portions 302 are only required to be open on the surface of the membrane main body 30 and do not have to necessarily be open on the surface of the coating layer.

The coating layers 34*a* and 34*b* are only required to cover at least one surface of the membrane main body 30. Accordingly, for example, the coating layer 34*a* may be provided only on the surface of the layer S (30*a*), or the coating layer 34*b* may be provided only on the surface of the layer C (30*b*). In the present embodiment, each of the surfaces of the membrane main body 30 are preferably coated with the coating layers 34*a* or 34*b* from the viewpoint of prevention of gas adsorption.

The coating layers 34*a* and 34*b* are only required to cover at least a portion of a surface of the membrane main body 30 and may not necessarily cover the surface entirely. However, from the viewpoint of prevention of gas adsorption, it is preferred that the surfaces of the membrane main body 30 be entirely coated with the coating layers 34*a* and 34*b*.

The average thickness of the coating layers 34*a* and 34*b* is preferably 1 to 10 μm, from the viewpoint of prevention of gas adsorption and of an increase in the electrical resistance due to the thickness.

The ion exchange membrane 3 is a membrane formed by coating each of the surfaces of ion exchange membrane 1 shown in FIG. 1 with the coating layers 34*a* and 34*b*. As for the members and configuration other than the coating layers 34*a* and 34*b*, the members and configuration of the ion exchange membrane 1 already described can be employed.

FIG. 18 illustrates a schematic cross-sectional view of a fourth aspect of the ion exchange membrane of the present embodiment. The ion exchange membrane 4 includes a membrane main body 40 constituted of a layer S (40*a*) and a layer C (40*b*) and reinforcement yarn 42 arranged inside the layer S (40*a*). On the surface of the layer S (40*a*) (see the arrow α), a plurality of raised portions 41 are formed and a plurality of opening portions 402 are formed, and a continuous hole 404 for connecting at least two of the opening portions 402 with one another is formed inside the membrane main body 40. An exposed portion A5, which is a portion of the reinforcement yarn 42 exposed, is formed on the surface of the membrane main body 40 on which the opening portions 402 are formed. Additionally, the surface of the layer S (40*a*) (see the arrow α) is coated with a coating layer 44*a*, and the surface of the layer C (40*b*) (see the arrow β) is coated with a coating layer 44*b*. That is, the ion exchange membrane 4 is a membrane formed by coating the surfaces of the membrane main body of the ion exchange membrane 2 shown in FIG. 15 with the coating layers. Coating each of the surfaces of the membrane main body 40 with the coating layers 44*a* and 44*b* can prevent gas generated on electrolysis from adsorbing the membrane surfaces. This can further improve the membrane permeability of the cations, and thus, the electrolytic voltage tends to be further reduced.

At the exposed portion A5, the reinforcement yarn 42 is only required to be exposed on at least the surface of the layer S (40*a*) and is not required to be exposed on the surface of the coating layer 44*a*.

The ion exchange membrane 4 is a membrane formed by coating each of the surfaces of ion exchange membrane 2 shown in FIG. 15 with the coating layers 44*a* and 44*b*. As for the members and configuration other than the coating layers 44*a* and 44*b*, the members and configuration of the ion exchange membrane 2 already described can be employed. As for the coating layers 44*a* and 44*b*, the members and constitutions described as the coating layers 34*a* and 34*b* employed in the ion exchange membrane 3 shown in FIG. 17 can be employed in the same manner.

As coating layers that may be employed in the present embodiment, in addition to those mentioned above, various known configurations such as the coating layer described in Japanese Patent Laid-Open No. 2019-108607 may be employed.

(Ion Exchange Capacity)

In the ion exchange membrane of the present embodiment, the ion exchange capacity of the fluorine-containing polymer refers to the equivalent of exchange groups per g of dry resin and can be determined by neutralization titration or infrared spectroscopic analysis. In the case of measurement by infrared spectroscopic analysis, the ion exchange capacity can be measured by a method described in Example described below. In the present embodiment, a value obtained by measuring a fluorine-containing polymer to be used (before hydrolysis treatment) by infrared spectroscopic analysis may be used as the ion exchange capacity, or a value obtained by measurement by neutralization titration after hydrolysis may be used as the ion exchange capacity.

The ion exchange capacity of the layer S is preferably 0.90 to 1.45 meq/g, more preferably 1.00 to 1.25 meq/g.

The ion exchange capacity of the layer C is 0.80 to 1.10 meq/g, preferably 0.80 to 1.00 meq/g, more preferably 0.83 to 0.98 meq/g. In the present embodiment, when the layer S and/or layer C are/is constituted of a plurality of layers, each of the layers preferably satisfies the aforementioned ion exchange capacity.

The strength change ratio 100×S2/S1, calculated from S2 and S1, is 85% or more and 120% or less, wherein S2 represents the strength of the ion exchange membrane measured after the ion exchange membrane of the present embodiment is subjected to the electrolysis test mentioned above, and S1 represents the strength of the ion exchange membrane measured before the ion exchange membrane is subjected to the electrolysis test. When the strength change ratio is less than 85% or more, retention of the strength for a long period is difficult. From the similar viewpoint as described above, the strength change ratio is preferably 90% or more and 120% or less, more preferably 95% or more and 120% or less.

The strength change ratio more specifically can be measured by a method described in Example described below.

The strength change ratio can be adjusted to be in the range described above, for example, by employing preferable production conditions described below. Especially, when a 2-stage saponification and salt exchange treatment to be mentioned below is conducted, the strength change ratio tends to be easily adjusted within the range described above.

The strength S1 before the ion exchange membrane of the present embodiment is subjected to the electrolysis test mentioned above is preferably 1.10 kgf/cm or more and 1.55 kgf/cm or less, more preferably 1.15 kgf/cm or more and 1.50 kgf/cm or less, still more preferably 1.15 kgf/cm or more and 1.45 kgf/cm or less, from the viewpoint of retention of the strength for a long period.

[Method for Producing Ion Exchange Membrane]

The method of producing an ion exchange membrane of the present embodiment is not particularly limited as long as an ion exchange membrane having the configuration mentioned above can be obtained. A suitable example of a method for producing an ion exchange membrane of the present embodiment includes a method including the following steps (1) to (5):

(1) a step of producing a fluorine-containing polymer having ion exchange groups or ion exchange group precursors, which may become ion exchange groups by hydrolysis;

(2) a step of obtaining a reinforcing material in which sacrifice yarn, which is soluble in acid or alkali and forms continuous holes, is arranged between adjacent strands of reinforcement yarn by interweaving at least a plurality of strands of the reinforcement yarn and the sacrifice yarn;

(3) a step of forming a film from the fluorine-containing polymer having ion exchange groups or ion exchange group precursors, which may become ion exchange groups by hydrolysis, to obtain a film;

(4) a step of embedding the reinforcing material in the film to obtain a membrane main body including the reinforcing material arranged therein; and (5) a step of hydrolyzing the ion exchange group precursors of the fluorine polymer with acid or alkali to obtain ion exchange groups and to dissolve the sacrifice yarn to thereby form continuous holes inside the membrane main body (hydrolysis step).

According to the method described above, in the step (4) of embedding, the membrane main body having desired raised portions formed can be obtained by controlling treatment conditions such as temperature, pressure, and time during embedding. Then, in the step (5), dissolution of the sacrifice yarn arranged inside the membrane main body enables continuous holes to be formed inside the membrane main body. This enables the ion exchange membrane to be obtained. Hereinafter, each of the steps will be described in more detail.

Step (1): Production of Fluorine-Containing Polymer

In the present embodiment, a fluorine-containing polymer having ion exchange groups or ion exchange group precursors, which may become ion exchange groups by hydrolysis, can be obtained by appropriately polymerizing the above monomers as mentioned above. In order to control the ion exchange capacity of the fluorine-containing polymer, it is only required that the mixture ratio of the raw material monomers and the like be adjusted in the production step as mentioned above.

Step (2): Step of Obtaining Reinforcing Material

In the step (2), adjustment of the shape and arrangement of the reinforcement yarn, sacrifice yarn and the like can control the opening area ratio, exposed area ratio, opening density, continuous hole arrangement and the like. For example, when the sacrifice yarn is made thicker, the sacrifice yarn is likely to be located near the surface of the membrane main body in the step (4) described below. The sacrifice yarn is dissolved in the step (5) described below, and opening portions are likely to be formed.

Controlling the number of strands of the sacrifice yarn also can control the opening density. Likewise, when the reinforcement yarn is made thicker, opening portion are likely to be formed.

Furthermore, the aforementioned aperture ratio of the reinforcement yarn can be controlled by adjusting the thickness of the reinforcement yarn and mesh, for example. That is, thicker reinforcement yarn tends to reduce the aperture ratio, and thinner reinforcement yarn tends to increase the aperture ratio. An increase of the mesh tends to reduce the aperture ratio, and less mesh tends to increase the aperture ratio. From the viewpoint of further increasing the electrolytic performance, the aperture ratio is preferably increased as described above, and from the viewpoint of achieving strength, the aperture ratio is preferably reduced.

Step (3): Step of film formation

In the step (3), a film is formed from the fluorine-containing polymer obtained in the step (1) by use of an extruder. The film may have a two-layer structure of a sulfonic acid layer and a carboxylic acid layer or may have a multilayer structure of three or more layers as described above. The method for forming a film is not particularly limited, and examples thereof include the following:

a method in which films are formed separately from fluorine-containing polymers each constituting the layers, and a method in which fluorine-containing polymers constituting both the carboxylic acid layer and the sulfonic acid layer are coextruded to form a composite film, and a fluorine-containing polymer constituting another sulfonic acid layer is separately used to form a film.

Coextrusion is preferred because of its contribution to an increase in the adhesive strength in the interface.

Step (4): Step of Obtaining Membrane Main Body

In the step (4), the reinforcing material obtained in the step (2) is embedded in the film obtained in the step (3) to obtain a membrane main body including the reinforcing material therein.

Examples of the embedding method include, but not limited to, a method in which the reinforcing material and the film are laminated in the order mentioned on breathable heat-resistant release paper on a flat plate or drum including a heat source and/or a vacuum source therein and having many pores on the surface thereof and integrated at a temperature at which the fluorine-containing polymer of the film melts while the air among each of the layers is evacuated by reduced pressure.

Examples of the embedding method in the case of a three-layer structure of two sulfonic acid layers and a carboxylic acid layer include, but not limited to, a method in which release paper, a reinforcing material, a film constituting a sulfonic acid layer, a film constituting a sulfonic acid layer, and a film constituting a carboxylic acid layer are laminated in the order mentioned on a drum and integrated, and a method in which release paper, a reinforcing material, a film constituting a sulfonic acid layer, and a composite film in which a sulfonic acid layer faces the reinforcing material side are laminated in the order mentioned and integrated.

An example of the embedding method in the case of a composite membrane having a multilayer structure of three or more layers includes, but not limited to, a method in which release paper, a reinforcing material, a plurality of films each constituting each of the layers, and a plurality of films each constituting each of the layers are laminated in the order mentioned on a drum and integrated. In the case of a multilayer structure of three or more layers, adjustment is preferably carried out such that the film constituting the carboxylic acid layer is laminated at the farthest position from the drum and the film constituting the sulfonic acid layer is laminated at a position near the drum.

The method including integration under a reduced pressure tends to make the third layer on the reinforcing material thicker than that of a pressure-application press method. A variety of laminations described herein is exemplary. After an appropriate and suitable lamination pattern (for example, combination of each of layers) is selected in consideration of the layer configuration and physical properties of a desired membrane main body, coextrusion can be carried out.

For the purpose of further improving the electric properties of the ion exchange membrane of the present embodiment, it is also possible to additionally interpose a layer containing both carboxylate functional groups and sulfonyl fluoride functional groups between the sulfonic acid layer and the carboxylic acid layer describe above or to use a layer containing both carboxylate functional groups and sulfonyl fluoride functional groups.

Examples of the method for producing a fluorine-containing polymer that forms this layer may include a method in which a polymer containing carboxylate functional groups and a polymer containing sulfonyl fluoride functional groups are separately produced and then mixed and a method in which both monomers containing carboxylate functional groups and monomers containing sulfonyl fluoride functional groups are copolymerized.

Step (5): Step of Hydrolyzing

In the step (5), the sacrifice yarn included in the membrane main body is removed by dissolution in acid or alkali to form continuous holes in the membrane main body. The sacrifice yarn has solubility in acid or alkali in the step of producing an ion exchange membrane or under an electrolysis environment. Thus, elution of the sacrifice yarn in acid or alkali from the membrane main body allows continuous holes to be formed at corresponding sites. The ion exchange membrane including continuous holes formed in the membrane main body can be obtained in this manner. The sacrifice yarn may remain in the continuous holes, not completely dissolved and removed. The sacrifice yarn remaining in the continuous holes may be dissolved and removed by the liquid electrolyte when electrolysis is carried out.

The acid or alkali used in the step (5) is only required to dissolve the sacrifice yarn, and the types thereof are not particularly limited. Examples of the acid include, but not limited to, hydrochloric acid, nitric acid, sulfuric acid, acetic acid, and fluorine-containing acetic acid. Examples of the alkali include, but not limited to, potassium hydroxide and sodium hydroxide.

The step of forming continuous holes by eluting the sacrifice yarn will be now described in more detail. FIG. 19 illustrates a schematic view for illustrating a method for forming continuous holes of the ion exchange membrane according to the present embodiment. FIG. 19 illustrates reinforcement yarn 52 and sacrifice yarn 504*a* (continuous holes 504 to be formed thereby) only, omitting illustration of the other members such as a membrane main body. First, the reinforcement yarn 52 and the sacrifice yarn 504*a* are interwoven to form a reinforcing material 5. Then, in the step (5), the sacrifice yarn 504*a* is eluted to form the continuous holes 504.

If the sacrifice yarn is entirely dissolved in the step (5), as described in Japanese Patent No. 5844653, in the case where the ion exchange membrane is mounted in an electrolyzer and an alkali chloride aqueous solution is poured into the electrolyzer, the alkali chloride aqueous solution may leak out of the electrolyzer through the dissolution holes. Thus, it is preferred to leave the 30 to 80% of the yarn diameter of the sacrifice yarn.

The method described above is simple because interweaving of the reinforcement yarn 52 and sacrifice yarn 504*a* may be adjusted depending on the arrangement of the reinforcement yarn 52, continuous holes 504, and opening portions (not shown) inside the membrane main body of the ion exchange membrane. FIG. 19 exemplifies the plain-woven reinforcing material 5 in which the reinforcement yarn 52 and sacrifice yarn 504*a* are interwoven along both the longitudinal direction and the lateral direction in the paper, and the arrangement of the reinforcement yarn 52 and the sacrifice yarn 504*a* in the reinforcing material 5 may be varied as required.

In the step (5), it is also possible to introduce ion exchange groups into ion exchange group precursors by hydrolyzing the obtained membrane main body obtained in the step (4).

In the step (5), the hydrolysis treatment can be followed by salt exchange treatment.

Conditions for the hydrolysis are not particularly limited, and the hydrolysis can be performed, for example, in an aqueous solution of 2.5 to 4.0N potassium hydroxide (KOH) and 20 to 40% by mass DMSO (dimethyl sulfoxide) at 40 to 95° C. for 10 minutes to 24 hours. Conditions for the subsequent salt exchange treatment are also not particularly limited, and the salt exchange treatment can be performed, for example, under conditions of 40 to 95° C., using a 0.1 to 1.0N sodium hydroxide (NaOH) solution for 0.1 hours to 1 hour.

In the present embodiment, from the viewpoint of easily adjusting the strength change ratio of the ion exchange membrane to be obtained within the predetermined range, the hydrolysis treatment and the salt exchange treatment each are preferably performed in multiple stages, each are more preferably performed in 2 stages.

In such hydrolysis treatment that may be conducted in 2 stages, it is preferred to employ a condition under which the ion exchange membrane relatively swells (for example, a high-temperature condition) in the first stage and to employ, then in the second stage, a condition under which the ion exchange membrane relatively contracts (for example, a low-temperature condition). In this case, the gap from the subsequent salt exchange (the ion exchange membrane tends to contract more greatly in comparison with the hydrolysis.) can be reduced, and consequently an ion exchange membrane having a smaller change in the strength tends to be obtained.

In such salt exchange treatment that may be conducted in 2 stages, it is preferred to employ a condition under which the ion exchange membrane relatively contracts in the first stage, and to employ, then in the second stage, a condition under which the ion exchange membrane relatively swells. In this case, the gap from the preceding hydrolysis (the salt exchange tends to more greatly contract the ion exchange membrane.) can be reduced, and consequently, an ion exchange membrane having a smaller change in the strength tends to be obtained. In the salt exchange treatment, the condition under which the ion exchange membrane is likely to swell and the condition under which the ion exchange membrane is likely to contract can be appropriately adjusted by increasing or decreasing the sodium hydroxide concentration to be used and the temperature.

As described above, in the hydrolysis treatment, the conditions under which the ion exchange membrane is allowed to swell first and then contract are preferable, and in the salt exchange treatment, the conditions under which the ion exchange membrane is allowed to contract first and then swell are preferable. In this case, specific conducting conditions in each stage of the hydrolysis treatment and the salt exchange treatment, which may be conducted in 2 stages, are not particularly limited. That is, conditions such as temperature, time, and concentration in each stage of the hydrolysis treatment and the salt exchange treatment, which may be conducted in 2 stages, can be appropriately determined in consideration of the configuration and the like of the ion exchange membrane to be treated (for example, the polymer composition to constitute the ion exchange membrane).

In the ion exchange membrane of the present embodiment, raised portions may be formed on the surface of the membrane main body, and the method for forming the raised portions is not particularly limited. A known method also can be employed including forming raised portions on a resin surface. In the present embodiment, an example of the method for forming raised portions on the surface of the membrane main body specifically includes a method including subjecting the surface of the membrane main body to embossing. For example, when the film, reinforcing material and the like are integrated, the raised portions described above can be formed using embossed release paper embossed in advance.

According to the method of producing an ion exchange membrane of the present embodiment, opening portions and exposed portions are formed by polishing the membrane in a wet state after hydrolysis. For this reason, the polymer in the membrane main body is sufficiently flexible, and the shape of the raised portion does not come off. In the case where raised portions are formed by embossing, the height and arrangement density of the raised portions can be controlled by controlling the emboss shape to be transferred (shape of the release paper).

After the steps (1) to (5) are accomplished, the aforementioned coating layers may be formed on the surfaces of the ion exchange membrane obtained.

[Electrolyzer]

The ion exchange membrane of the present embodiment can be used in various electrolyzers. That is, the electrolyzer of the present embodiment includes the ion exchange membrane of the present embodiment. As illustrated in FIG. 20, an electrolyzer 13 includes at least an anode 11, a cathode 12, and an ion exchange membrane of the present embodiment arranged between the anode and the cathode. The electrolyzer can be used for various types of electrolysis, and as a typical example, a case when the electrolyzer is used for electrolysis of an alkali chloride aqueous solution will be described below.

Electrolysis conditions are not particularly limited, and the electrolysis can be carried out under known conditions. For example, with the anode chamber provided with 2.5 to 5.5N alkali chloride aqueous solution and the cathode chamber provided with water or diluted alkali hydroxide aqueous solution, electrolysis can be carried out under conditions including an electrolysis temperature of 50 to 120° C. and a current density of 5 to 100 A/dm$^2$.

The configuration of the electrolyzer according to the present embodiment is not particularly limited and may be monopolar or bipolar, for example. Materials constituting the electrolyzer are not particularly limited. As materials for the anode chamber, titanium and the like, which are resistant to alkali chloride and chlorine, are preferred. As materials for the cathode chamber, nickel and the like, which are resistant to alkali hydroxide and hydrogen, are preferred. As for the arrangement of the electrodes, even when the ion exchange membrane and the anode are arranged with an appropriate gap therebetween or even when the anode is arranged in contact with the ion exchange membrane, the ion exchange membrane can be used without any problem. In a contact electrolyzer (zero-gap base electrolyzer), in which no gap is provided between the ion exchange membrane and the anode and between the ion exchange membrane and the cathode, the ion exchange membrane of the present embodiment achieves a greater effect.

EXAMPLES

Hereinafter, the present embodiment will be described in detail by means of examples. The present embodiment is not intended to be limited to the following examples.

[Method for Measuring Average Cross-Sectional Thickness of Membrane A]

The ion exchange membrane after the hydrolysis step was cut in the vertical direction from the layer C side or the layer S side to the surface of the layer to obtain a sample having a longer side of 6 mm or more and a shorter side of about 100 μm. At this time, as shown in FIG. 4, the sides of the sample were allowed to be parallel to four strands of the reinforcement yarn. The thickness of the sample in a water-containing state was measured using an optical microscope with a cross section facing upward. In this case, a portion to be cut off included two or more adjacent strands of the reinforcement yarn, two or more adjacent continuous holes (derived from the sacrifice yarn), and the center portion of the region surround by the strands of the reinforcement yarn and the continuous holes, which is a portion indicated by "○" in FIG. 4. A piece to be cut off included six or more strands of the reinforcement yarn perpendicular to the cutting direction. Such a piece was sampled at three positions. From the cross-sectional view of each of the pieces obtained, a was measured as shown in FIGS. 5 to 6 to calculate a (min) for each piece. From a (min) at three positions, the average cross-sectional thickness of membrane A was calculated.

[Method for Measuring Average Cross-Sectional Thickness of Membrane B]

The ion exchange membrane after the hydrolysis step was cut in the vertical direction from the layer C side or the layer S side to the surface of the layer to obtain a sample having a longer side of 6 mm or more and a shorter side of about 100 μm. At this time, as shown in FIG. 4, the sides of the sample were allowed to be parallel to four strands of the reinforcement yarn. The thickness of the sample in a water-containing state was measured using an optical microscope with a cross section facing upward. In this case, a portion to be cut off was the center portion of the reinforcement yarn, which included portions indicated by □ or Δ in FIG. 4. A piece to be cut off included 15 or more strands of the reinforcement yarn perpendicular to the cutting direction. Such a piece was sampled at three positions. From the cross-sectional view of each of the pieces obtained, b was measured as shown in FIGS. 7 to 8 to calculate b (min) for each piece. From b (min) at three positions, the average cross-sectional thickness of membrane B was calculated.

[Measurement of Strength S1 Before Electrolysis Test]

The strength S1 of the ion exchange membrane (strength before the electrolysis test mentioned below is conducted) in Examples and Comparative Examples, which was breaking strength obtained by tensile testing, was measured on the ion exchange membrane swelled with pure water by the following method. Along the direction at an angle of 45 degrees with respect to the reinforcing yarn embedded in the ion exchange membrane, a sample having a width of 1 cm was cut from the ion exchange membrane immersed in pure water. Then, the breaking elongation of the sample was measured under conditions including a distance between chucks of 5 cm and a tensile speed of 100 mm/minute in compliance with JISK6732. The measurement sample was stored by immersion in pure water at 25° C. until immediately before measurement, and was measured within three minutes after the sample was taken out of pure water. Seven samples from the same ion exchange membrane were measured, and the average value of the seven breaking elongation values was taken as the strength of the ion exchange membrane S1.

[Measurement of Strength S2 and Voltage after Electrolysis Test]

The electrolyzer used for electrolysis was one in which four natural-circulation zero-gap electrolytic cells were arranged in series, each of which had a structure including an ion exchange membrane arranged between an anode and a cathode. As the cathode, woven mesh was used formed by knitting nickel fine wire having a diameter of 0.15 mm and coated with cerium oxide and ruthenium oxide as catalysts in a sieve mesh size of 50. To bring the cathode into close contact with the ion exchange membrane, a mat formed by knitting nickel fine wire was arranged between a collector made of nickel expanded metal and the cathode. As the anode, used was titanium expanded metal coated with ruthenium oxide, iridium oxide, and titanium oxide as catalysts. By use of the electrolyzer described above, brine was supplied to the anode side while the concentration was adjusted to be 205 g/L, and water was supplied to the cathode side while the sodium hydroxide concentration was maintained at 32% by mass. Electrolysis was carried out for 7 days with the temperature of the electrolyzer set to 85° C., at a current density of 6 kA/m$^2$ under a condition in which the liquid pressure of the cathode side of the electrolyzer was higher than the liquid pressure of the anode side by 5.3 kPa.

After the electrolysis test described above, the strength S2 and the voltage were measured. That is, the strength of the ion exchange membrane after the electrolysis test S2 was measured by the same method as in [Measurement of strength S1 before electrolysis test] described above.

The strength change ratio due to the electrolysis test was calculated by the following formula.

Strength change ratio (%)=100×S2/S1

As the voltage after the electrolysis test, the average value of the voltage values of 5 days, 6 days, and 7 days after the start of the operation was used.

[Measurement of Ion Exchange Capacity]

As a fluorine-containing polymer having ion exchange groups, about 1 g of a fluorine-containing polymer A-1, a fluorine-containing polymer A-2, or a fluorine-containing polymer B in each example described below was used and press-formed at a temperature about 30° C. higher than the pseudo-melting point of the polymer to obtain a film corresponding to each polymer. The obtained film was measured by a transmission infrared spectroscopic analyzer (FTIR-4200 manufactured by JASCO Corporation). From the height of each of the obtained infrared peaks $CF_2$, CF, $CH_3$, OH, and $SO_2F$, the proportion of structural units having groups that can be converted into carboxylic acid functional groups or sulfonic acid functional groups was calculated. The proportion was taken as the proportion of structural units having carboxylic acid functional groups or sulfonic acid functional groups obtained by hydrolyzing the fluorine-containing polymer, and a calibration curve of a sample having a known ion exchange capacity calculated by a titration method was used to determine the ion exchange capacity.

Example 1

Solution polymerization was performed in order to obtain a fluorine polymer C-1 (fluorine-containing polymer having a carboxylic acid group). The stirring blade used was anchor-shaped. First, 561.5 g of $CF_2{=}CFOCF_2CF(CF_3)O(CF_2)_2COOCH_3$ and 561.5 g of $CF_3CHFCHFCF_2CF_3$ (hereinafter, "HFC-43-10mee") were introduced into a 1 L stainless steel autoclave. The vessel was fully replaced with nitrogen, then further replaced with $CF_2{=}CF_2$ (hereinafter "TFE"), heated until the temperature inside the vessel became stable at 25° C., and pressurized by TFE to 0.411 MPa-G (gauge pressure). Then, 4.49 g of a 5% solution of $(CF_3CF_2CF_2COO)_2$ in HFC43-10mee as a polymerization initiator and 0.059 g of ethanol as a chain transfer agent were introduced therein to start the reaction. TFE was intermittently fed while stirring at 25° C., 0.059 g of ethanol was added in the process to lower the TFE pressure from 0.411 MPa-G initially to 0.387 MPa-G at the end, and 14 mL of methanol was added after 2.5 hours to terminate the polymerization. After unreacted TFE was discharged to the outside of the system, the liquid was removed by subjecting the resulting polymerization liquid to heating and pressure reduction to thereby obtain 68 g of the fluorine polymer C-1. The resulting fluorine polymer C-1 was kneaded in a LABO PLASTOMILL (model 4M150) of Toyo Seiki Seisaku-sho, Ltd. at a temperature of 260° C. and a number of revolutions of the blade of 50 rpm for 20 minutes. Thereafter, the EW of the fluorine polymer C-1 was determined by neutralization titration, and the ion exchange capacity was 0.89 meq/g.

Monomers represented by the following general formula (1) and monomers represented by the following general formula (2) were copolymerized to obtain a polymer having an ion exchange capacity of 1.05 meq/g, as a fluorine-containing polymer S-1 (fluorine-containing polymer having a sulfonic acid group).

$$CF_2{=}CF_2 \tag{1}$$

$$CF_2{=}CFO{-}CF_2CF(CF_3)O{-}(CF_2)_2{-}SO_2F \tag{2}$$

Monomers represented by the general formula (1) and monomers represented by the general formula (2) were copolymerized to obtain a polymer having an ion exchange capacity of 1.03 meq/g, as a fluorine-containing polymer S-2 (fluorine-containing polymer having a sulfonic acid group).

The fluorine polymer S-2 and the fluorine polymer C-1 were provided and coextruded by an apparatus equipped with two extruders, a T die for two layer extrusion, and a take-up apparatus to obtain a two-layer film (α) having a thickness of 50 μm. The observation result of the cross-section of the film obtained with an optical microscope showed that the thickness of the layer S-2 was 38 μm and the thickness of the layer C was 12 Additionally, a single-layer T die was used to obtain a single-layer film of a layer S-1 (b) having a thickness of 42 μm.

As reinforcement yarn, a yarn-like material prepared by twisting tape yarn made of polytetrafluoroethylene (PTFE) and having a yarn diameter of 100 deniers at 900 turns/m (hereinafter, referred to as PTFE yarn) was used. As weft sacrifice yarn, yarn prepared by twisting polyethylene terephthalate (PET) of 35 deniers and 8 filaments at 200 turns/m (hereinafter, referred to as PET yarn) was used. As weft sacrifice yarn, yarn prepared by twisting polyethylene terephthalate (PET) of 35 deniers and 8 filaments at 200 turns/m (hereinafter, referred to as PET yarn) was used. First, plain-weaving was carried out with the PTFE yarn arranged at 24 strands/inch and two strands of the sacrifice yarn arranged between adjacent strands of the PTFE yarns, and widening was carried out in the weft direction in heated air to obtain a reinforcing material 1 having a thickness of 100 μm.

On a drum including a heat source and a vacuum source therein and having many micropores on the surface thereof, embossed breathable heat-resistant release paper, the reinforcing material 1, the single-layer film (b), and the two-layer film (α) were laminated in the order mentioned (here, the layer S-2 of the two-layer film was arranged on the side of the single-layer film (b).) and integrated at a drum surface temperature of 230° C. and under a reduced pressure of −650 mmHg while the air among each of the materials was evacuated to obtain a composite membrane. In the integration step, during the period from feeding of the materials to contact of the materials with the drum, the extension ratio of the single-layer film and two-layer film in the running direction was controlled to be 4% or less. As the result of observation of the surface of the obtained membrane, it was observed that hemispherical projected portions having an average height of 60 μm constituted only by a polymer having ion exchange groups were formed on the anode-side film (b) at a density of 250 raised portions/$cm^2$ and the total area of the raised portions was 0.2 $cm^2$ per $cm^2$. Saponification was conducted in 2 stages on the obtained composite membrane as follows. For former stage saponification, the composite membrane was immersed in an aqueous solution at 81° C. comprising 30% by mass of dimethyl sulfoxide (DMSO) and 15% by mass of potassium hydroxide (KOH) for 0.1 hours. Next, for latter stage saponification, the composite membrane was immersed in an aqueous solution at 60° C. comprising 30% by mass of dimethyl sulfoxide (DMSO) and 15% by mass of potassium hydroxide (KOH) for 0.6 hours.

Subsequent to the 2-stage saponification mentioned above, salt exchange treatment was conducted in 2 stages as follows. For former stage salt exchange treatment, the composite membrane was immersed in 0.6N NaOH at 90° C. for 0.3 hours. Next, for latter stage salt exchange treatment, the composite membrane was immersed in 0.1 N NaOH at 50° C. for 0.5 hours to replace the ion attached to the ion exchange group by Na.

Subsequent to the 2-stage salt exchange treatment mentioned above, the membrane was washed with water and further dried at 60° C. to obtain a membrane main body.

Additionally, a polymer (B3) as a dried resin, which was a copolymer of $CF_2{=}CF_2$ and $CF_2{=}CFOCF_2CF(CF_3)OCF_2CF_2SO_2F$ and had an ion exchange capacity of 1.05 mg eq/g, was hydrolyzed and then converted into its acid form with hydrochloric acid. In a solution obtained by dissolving this acidic-form polymer (B3) at a proportion of 5% by mass in a 50/50 (mass ratio) mixed solution of water and ethanol, zirconium oxide particles having a primary particle size of 1.15 μm were added so as to achieve a mass ratio of the polymer (B3) to the total mass of the polymer (B3) and the zirconium oxide particles of 0.33. Thereafter, the zirconium oxide particles were dispersed with a ball mill until the average particle size in a suspension liquid reached 0.94 μm to thereby obtain the suspension liquid. Note that the zirconium oxide used was one obtained by pulverizing raw stones. Note that the average particle size described above was median diameter (D50) and was measured with a particle size analyzer ("SALD2200", SHIMADZU CORPORATION).

The suspension liquid was applied to both the surfaces of the ion exchange membrane by a spray method. In the meantime, the average droplet size of the spray was adjusted to 46 μm. Additionally, the surface temperature of the membrane main body was adjusted to 57° C. to dry the surfaces, and then, an ion exchange membrane having a coating layer including the polymer (B3) and the zirconium oxide particles was obtained. In this ion exchange membrane, the content of the fluorine-containing polymer in the binder was 100% by mass. Note that the average droplet size means the volume average diameter D (4,3). For the measurement thereof, droplets located between the nozzle tip and a point 200 mm away therefrom in the droplet discharge direction were used as objects, using a "Spraytec" manufactured by Malvern Ltd. under a 25° C. atmosphere to determine the droplet size from the laser scattered light intensity. Hereinafter, average droplet sizes were determined in the same manner.

The average thickness, membrane strength, and electrolytic voltage of the ion exchange membrane obtained as described above were each measured, and the results are shown in Table 1.

Examples 2 to 4 and Comparative Examples 1 to 3

Ion exchange membranes were obtained in the same manner as in Example 1 except that the saponification conditions and salt exchange treatment conditions were changed as described in Table 1. The average thickness, membrane strength, and electrolytic voltage of the obtained ion exchange membranes were each measured, and the results are shown in Table 1.

Comparative Example 4

The polymerization ratio of the monomers in the fluorine polymer C-1 used in Example 1 was adjusted to obtain a polymer having an ion exchange capacity of 0.83 meq/g. The polymerization ratio of the monomers in the fluorine-containing polymer S-2 used in Example 1 was adjusted to obtain a polymer having an ion exchange capacity of 0.95 meq/g. A two-layer film (α) having a thickness of 50 μm (the thickness of the layer S-2 was 38 μm, and the thickness of the layer C was 12 μm.) was obtained in the same manner as in Example 1 except that these polymers were used. A composite membrane was obtained in the same manner as in Example 1 except that this two-layer film (α) was used. As the result of observation of the surface of the obtained composite membrane, it was observed that hemispherical projected portions having an average height of 60 μm constituted only by a polymer having ion exchange groups were formed on the anode-side film (b) at a density of 250 raised portions/$cm^2$ and the total area of the raised portions was 0.2 $cm^2$ per $cm^2$.

Saponification was conducted on the obtained composite membrane as follows. That is, the composite membrane was immersed in an aqueous solution at 75° C. comprising 30% by mass of dimethyl sulfoxide (DMSO) and 15% by mass of potassium hydroxide (KOH) for 0.8 hours.

Subsequent to the saponification described above, salt exchange treatment was conducted in 2 stages as follows. For former stage salt exchange treatment, the composite membrane was immersed in 1 N NaOH at 90° C. for 0.5 hours. Next, for latter stage salt exchange treatment, the composite membrane was immersed in 0.3N NaOH at 50° C. for 1 hours to replace the ion attached to the ion exchange group by Na.

Subsequent to the 2-stage salt exchange treatment mentioned above, the membrane was washed with water and further dried at 60° C. to obtain a membrane main body. Thereafter, a coating layer was formed in the same manner as in Example 1 to obtain an ion exchange membrane.

The average thickness, membrane strength, and electrolytic voltage of the obtained ion exchange membranes were each measured, and the results are shown in Table 1.

Comparative Examples 5 to 7

Ion exchange membranes were obtained in the same manner as in Comparative Example 4 except that the saponification conditions and salt exchange treatment conditions were changed as described in Table 1. The average thickness, membrane strength, and electrolytic voltage of the obtained ion exchange membranes were each measured, and the results are shown in Table 1.

Comparative Example 8

The polymerization ratio of the monomers in the fluorine polymer C-1 used in Example 1 was adjusted to obtain a polymer having an ion exchange capacity of 0.85 meq/g. This polymer and the fluorine polymer S-2 used in Example 1 (ion exchange capacity: 1.03 meq/g) were subjected to coextrusion using the same apparatus as that of Example 1 to obtain a two-layer film (α) having a thickness of 115 μm. The observation result of the cross-section of the film obtained with an optical microscope showed that the thickness of the layer S-2 was 100 μm and the thickness of the layer C was 15 μm.

On a drum including a heat source and a vacuum source therein and having many micropores on the surface thereof, embossed breathable heat-resistant release paper, the reinforcing material 1, and the two-layer film (α) having a thickness of 115 μm obtained above were laminated in the order mentioned and integrated at a drum surface temperature of 230° C. and under a reduced pressure of −650 mmHg while the air among each of the materials was evacuated to obtain a composite membrane. In the integration step, during the period from feeding of the materials to contact of the materials with the drum, the extension ratio of the two-layer film in the running direction was controlled to be 4% or less. As the result of observation of the surface of the obtained membrane, it was observed that hemispherical projected portions having an average height of 60 μm constituted only by a polymer having ion exchange groups were formed on the anode side at a density of 250 raised portions/cm$^2$ and the total area of the raised portions was 0.2 cm$^2$ per cm$^2$.

Saponification was conducted on the obtained composite membrane as follows. That is, the composite membrane was immersed in an aqueous solution at 88° C. comprising 30% by mass of dimethyl sulfoxide (DMSO) and 15% by mass of potassium hydroxide (KOH) for 0.2 hours.

Subsequent to the saponification described above, salt exchange treatment was conducted in 2 stages as follows. For former stage salt exchange treatment, the composite membrane was immersed in 1 N NaOH at 50° C. for 0.6 hours. Next, for latter stage salt exchange treatment, the composite membrane was immersed in 0.4N NaOH at 90° C. for 0.6 hours to replace the ion attached to the ion exchange group by Na.

Subsequent to the 2-stage salt exchange treatment mentioned above, the membrane was washed with water and further dried at 60° C. to obtain a membrane main body. Thereafter, a coating layer was formed in the same manner as in Example 1 to obtain an ion exchange membrane.

The average thickness, membrane strength, and electrolytic voltage of the obtained ion exchange membranes were each measured, and the results are shown in Table 1.

Comparative Example 9

An ion exchange membrane was obtained in the same manner as in Comparative Example 8 except that the saponification conditions were changed as described in Table 1. The average thickness, membrane strength, and electrolytic voltage of the obtained ion exchange membranes were each measured, and the results are shown in Table 1.

Comparative Example 10

The polymerization ratio of the monomers in the fluorine polymer C-1 used in Example 1 was adjusted to obtain a polymer having an ion exchange capacity of 0.85 meq/g. This polymer and the fluorine polymer S-1 used in Example 1 (ion exchange capacity: 1.05 meq/g) were subjected to coextrusion using the same apparatus as that of Example 1 to obtain a two-layer film (α) having a thickness of 112 μm. The observation result of the cross-section of the film obtained with an optical microscope showed that the thickness of the layer S-1 was 100 μm and the thickness of the layer C was 12

On a drum including a heat source and a vacuum source therein and having many micropores on the surface thereof, embossed breathable heat-resistant release paper, the reinforcing material 1, and the two-layer film (α) having a thickness of 112 μm obtained above were laminated in the order mentioned and integrated at a drum surface temperature of 230° C. and under a reduced pressure of −650 mmHg while the air among each of the materials was evacuated to obtain a composite membrane. In the integration step, during the period from feeding of the materials to contact of the materials with the drum, the extension ratio of the two-layer film in the running direction was controlled to be 4% or less. As the result of observation of the surface of the obtained membrane, it was observed that hemispherical projected portions having an average height of 60 μm constituted only by a polymer having ion exchange groups were formed on the anode side at a density of 250 raised portions/cm$^2$ and the total area of the raised portions was 0.2 cm$^2$ per cm$^2$.

Saponification was conducted on the obtained composite membrane as follows. That is, the composite membrane was immersed in an aqueous solution at 73° C. comprising 30% by mass of dimethyl sulfoxide (DMSO) and 15% by mass of potassium hydroxide (KOH) for 0.3 hours.

Subsequent to the saponification described above, salt exchange treatment was conducted in 2 stages as follows. For former stage salt exchange treatment, the composite membrane was immersed in 0.6N NaOH at 50° C. for 0.3 hours. Next, for latter stage salt exchange treatment, the composite membrane was immersed in 0.6N NaOH at 90° C. for 1 hours to replace the ion attached to the ion exchange group by Na.

Subsequent to the 2-stage salt exchange treatment mentioned above, the membrane was washed with water and further dried at 60° C. to obtain a membrane main body. Thereafter, a coating layer was formed in the same manner as in Example 1 to obtain an ion exchange membrane.

The average thickness, membrane strength, and electrolytic voltage of the obtained ion exchange membranes were each measured, and the results are shown in Table 1.

Comparative Example 11

Ion exchange membranes were obtained in the same manner as in Comparative Example 10 except that the saponification conditions and salt exchange treatment conditions were changed as described in Table 1. The average thickness, membrane strength, and electrolytic voltage of the obtained ion exchange membranes were each measured, and the results are shown in Table 1.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Average thickness B (μm) | 226 | 226 | 226 | 226 | 226 | 226 | 226 | 222 |
| Average thickness A (μm) | 55 | 55 | 55 | 55 | 55 | 55 | 55 | 48 |
| A/B | 0.24 | 0.24 | 0.24 | 0.24 | 0.24 | 0.24 | 0.24 | 0.22 |
| Tc (μm) | 14 | 14 | 14 | 14 | 14 | 14 | 14 | 13 |
| Tc/A | 0.25 | 0.25 | 0.25 | 0.25 | 0.25 | 0.25 | 0.25 | 0.27 |
| Former stage saponification temperature (° C.) | 81 | 78 | 87 | 91 | 52 | 66 | 75 | 75 |
| Former stage saponification time (h) | 0.1 | 0.4 | 0.2 | 0.1 | 0.6 | 0.4 | 0.3 | 0.8 |
| Latter stage saponification temperature (° C.) | 60 | 50 | 60 | 50 | 80 | 80 | 70 | Not applicable |
| Latter saponification time (h) | 0.6 | 0.4 | 0.5 | 0.4 | 0.2 | 0.2 | 0.4 | Not applicable |
| Former stage salt exchange temperature (° C.) | 90 | 90 | 90 | 90 | 90 | 90 | 90 | 90 |
| Former stage salt exchange concentration (N) | 0.6 | 0.1 | 0.6 | 0.6 | 0.1 | 0.6 | 0.6 | 1 |
| Former stage salt exchange time (h) | 0.3 | 0.6 | 0.4 | 0.2 | 0.5 | 0.3 | 0.4 | 0.5 |
| Latter stage salt exchange temperature (° C.) | 50 | 50 | 90 | 90 | 90 | 50 | 90 | 50 |
| Latter stage salt exchange concentration (N) | 0.1 | 0.6 | 0.1 | 0.1 | 0.6 | 0.1 | 0.1 | 0.3 |
| Latter stage salt exchange time (h) | 0.5 | 0.2 | 0.4 | 0.6 | 0.3 | 0.5 | 0.4 | 1 |
| S1 (kgf/cm) | 1.39 | 1.28 | 1.34 | 1.16 | 1.17 | 1.23 | 1.31 | 1.61 |
| Strength change ratio | 98% | 106% | 100% | 119% | 79% | 76% | 81% | 84% |
| Voltage after electrolysis test | 2.93 V | 2.93 V | 2.93 V | 2.93 V | 2.97 V | 2.97 V | 2.97 V | 2.96 V |

| | Comparative Example 5 | Comparative Example 6 | Comparative Example 7 | Comparative Example 8 | Comparative Example 9 | Comparative Example 10 | Comparative Example 11 |
|---|---|---|---|---|---|---|---|
| Average thickness B (μm) | 222 | 222 | 222 | 230 | 230 | 243 | 243 |
| Average thickness A (μm) | 48 | 48 | 48 | 118 | 118 | 87 | 87 |
| A/B | 0.22 | 0.22 | 0.22 | 0.51 | 0.51 | 0.36 | 0.36 |
| Tc (μm) | 13 | 13 | 13 | 17 | 17 | 13 | 13 |
| Tc/A | 0.27 | 0.27 | 0.27 | 0.14 | 0.14 | 0.15 | 0.15 |
| Former stage saponification temperature (° C.) | 88 | 91 | 79 | 88 | 78 | 73 | 82 |
| Former stage saponification time (h) | 0.3 | 0.1 | 0.2 | 0.2 | 0.4 | 0.3 | 0.3 |
| Latter stage saponification temperature (° C.) | Not applicable | Not applicable | Not applicable | Not applicable | Not applicable | Not applicable | Not applicable |
| Latter saponification time (h) | Not applicable | Not applicable | Not applicable | Not applicable | Not applicable | Not applicable | Not applicable |
| Former stage salt exchange temperature (° C.) | 90 | 90 | 90 | 50 | 50 | 50 | 50 |
| Former stage salt exchange concentration (N) | 1 | 0.6 | 0.6 | 1 | 1 | 0.6 | 0.6 |
| Former stage salt exchange time (h) | 0.4 | 0.7 | 0.7 | 0.6 | 0.6 | 0.3 | 0.4 |
| Latter stage salt exchange temperature (° C.) | 50 | 90 | 90 | 90 | 90 | 90 | 90 |
| Latter stage salt exchange concentration (N) | 0.4 | 0.3 | 0.6 | 0.4 | 0.4 | 0.6 | 0.6 |
| Latter stage salt exchange time (h) | 1 | 1 | 1 | 0.6 | 0.6 | 1 | 1 |

TABLE 1-continued

| | | | | | | | |
|---|---|---|---|---|---|---|---|
| S1 (kgf/cm) | 1.55 | 1.29 | 1.31 | 1.73 | 1.85 | 1.53 | 1.47 |
| Strength change ratio | 75% | 82% | 63% | 101% | 106% | 103% | 101% |
| Voltage after electrolysis test | 2.96 V | 2.96 V | 2.96 V | 2.98 V | 2.98 V | 2.97 V | 2.97 V |

The invention claimed is:

1. An ion exchange membrane comprising:

a layer S comprising a fluorine-containing polymer having a sulfonic acid group;

a layer C comprising a fluorine-containing polymer having a carboxylic acid group; and a plurality of reinforcing materials functioning as at least one of a reinforcement yarn and a sacrifice yarn;

wherein, when the ion exchange membrane is viewed from a top surface, an average cross-sectional thickness A of the ion exchange membrane measured in pure water for a region, in which the reinforcing materials do not exist, is 20 μm or more and 75 μm or less, and wherein a strength change ratio calculated from a strength S2 of the ion exchange membrane measured after the ion exchange membrane is subjected to an electrolysis test described below and a strength S1 of the ion exchange membrane measured before the ion exchange membrane is subjected to the electrolysis test, in terms of 100×S2/S1, is 85% or more and 120% or less:

(Electrolysis test)

A woven mesh formed by knitting a nickel fine wire having a diameter of 0.15 mm and coated with a cerium oxide and a ruthenium oxide as cathode catalysts in a sieve mesh size of 50 is used as a cathode, and a titanium expanded metal coated with a ruthenium oxide, an iridium oxide, and a titanium oxide as anode catalysts is used as an anode; the ion exchange membrane is arranged between the anode and the cathode, and further, in order to bring the cathode into close contact with the ion exchange membrane, a collector made of a nickel expanded metal is arranged on the cathode, and a mat formed by knitting a nickel fine wire is arranged between the collector and the cathode to provide a natural-circulation zero-gap electrolytic cell; four such zero-gap electrolytic cells are arranged in series for use as an electrolyzer; brine is supplied to an anode side of the electrolyzer while a concentration of the brine is adjusted to be 205 g/L, and water is supplied to a cathode side of the electrolyzer while the sodium hydroxide concentration is maintained at 32% by mass; and electrolysis is carried out for 7 days with a temperature of the electrolyzer set to 85° C., at a current density of 6 $kA/m^2$ under a condition in which a liquid pressure of the cathode side of the electrolyzer is higher than the liquid pressure of the anode side by 5.3 kPa.

2. The ion exchange membrane according to claim 1, wherein, when the ion exchange membrane is viewed from the top surface, a value of A/B is 0.15 or more and 0.30 or less, wherein B represents an average cross-sectional thickness of the ion exchange membrane measured in pure water for a region, in which strands of the reinforcement yarn cross each other, and for a region, in which the reinforcement yarn crosses the sacrifice yarn.

3. The ion exchange membrane according to claim 1, wherein the strength S1 is 1.10 kgf/cm or more and 1.55 kgf/cm or less.

4. The ion exchange membrane according to claim 1, wherein a ratio of the thickness Tc of the layer C to the A, in terms of Tc/A, is 0.165 or more and 0.508 or less.

5. An electrolyzer comprising the ion exchange membrane according to claim 1.

* * * * *